US012675055B2

(12) United States Patent
Fukuma

(10) Patent No.: US 12,675,055 B2
(45) Date of Patent: Jul. 7, 2026

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventor: Michinori Fukuma, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 667 days.

(21) Appl. No.: 18/179,718

(22) Filed: Mar. 7, 2023

(65) Prior Publication Data

US 2024/0118638 A1 Apr. 11, 2024

(30) Foreign Application Priority Data

Sep. 28, 2022 (JP) ................................ 2022-155526

(51) Int. Cl.

| | |
|---|---|
| ***G03G 5/147*** | (2006.01) |
| ***G03G 5/06*** | (2006.01) |
| ***G03G 15/00*** | (2006.01) |
| ***G03G 21/18*** | (2006.01) |

(52) U.S. Cl.

CPC ..... *G03G 5/14704* (2013.01); *G03G 5/06144* (2020.05); *G03G 15/75* (2013.01); *G03G 21/1814* (2013.01)

(58) Field of Classification Search

CPC .......................... G03G 5/0436; G03G 5/14704

See application file for complete search history.

(56) References Cited

U.S. PATENT DOCUMENTS

| | | | | |
|---|---|---|---|---|
| 2008/0254379 A1* | 10/2008 | Iwanaga | ................ | G03G 5/047 430/66 |
| 2016/0246194 A1* | 8/2016 | Tsurumi | ............... | G03G 9/0823 |
| 2020/0012205 A1* | 1/2020 | Kigoshi | ................. | G03G 15/75 |

FOREIGN PATENT DOCUMENTS

| | | |
|---|---|---|
| JP | 2011-028218 A | 2/2011 |
| JP | 2011-218426 A | 11/2011 |

* cited by examiner

*Primary Examiner* — Peter L Vajda

(74) *Attorney, Agent, or Firm* — Sughrue Mion, PLLC

(57) ABSTRACT

An electrophotographic photoreceptor includes a conductive substrate, an organic photosensitive layer, and an inorganic protection layer arranged in this order, the inorganic protection layer containing a metal oxide that contains oxygen atoms, gallium atoms, and aluminum atoms.

17 Claims, 5 Drawing Sheets

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-155526 filed Sep. 28, 2022.

BACKGROUND

(i) Technical Field

The present disclosure relates to an electrophotographic photoreceptor, a process cartridge, and an image forming apparatus.

(ii) Related Art

Japanese Unexamined Patent Application Publication No. 2011-028218 proposes an electrophotographic photoreceptor that includes, in order of arrangement, a substrate, a photosensitive layer, and a protection layer containing oxygen and gallium, the protection layer having a first region present on an outer peripheral surface side and a second region that is closer to the substrate than the first region is to the substrate and that has a larger atomic ratio [oxygen/gallium] than the first region.

SUMMARY

Aspects of non-limiting embodiments of the present disclosure relate to providing an electrophotographic photoreceptor that reduces occurrence of image quality nonuniformity compared to an electrophotographic photoreceptor that includes a conductive substrate, an organic photosensitive layer, and an inorganic protection layer arranged in this order, the inorganic protection layer containing a metal oxide that contains oxygen atoms and gallium atoms but not aluminum atoms.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrophotographic photoreceptor including a conductive substrate, an organic photosensitive layer, and an inorganic protection layer arranged in this order, the inorganic protection layer containing a metal oxide that contains oxygen atoms, gallium atoms, and aluminum atoms.

BRIEF DESCRIPTION OF THE DRAWINGS

Exemplary embodiments of the present disclosure will be described in detail based on the following figures, wherein.

DETAILED DESCRIPTION

Figure 1:
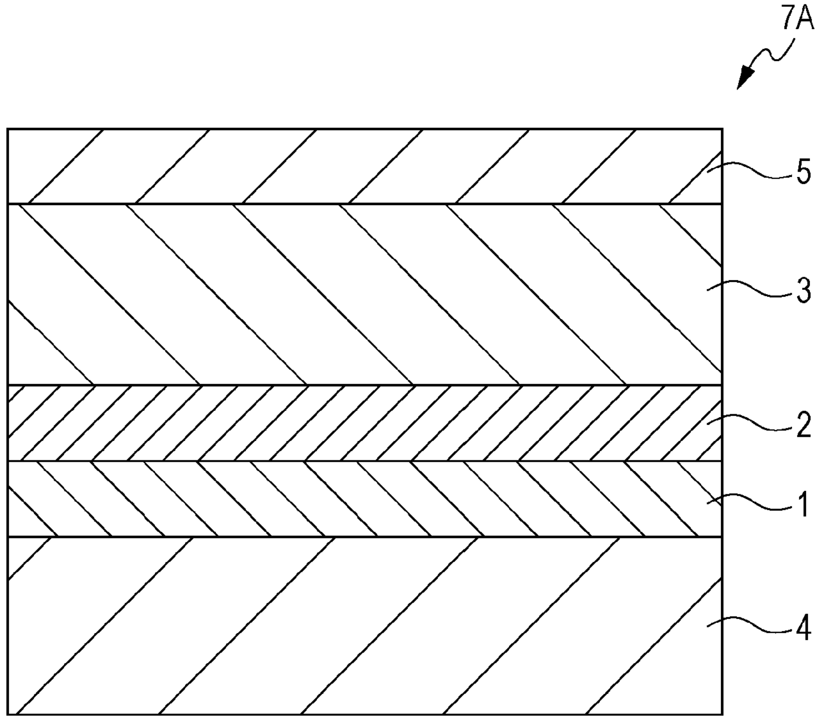
FIG. 1 is a schematic cross-sectional view of one example of the layer structure of an electrophotographic photoreceptor according to one exemplary embodiment.

Exemplary embodiments which are some examples of the present disclosure will now be described. The following descriptions and examples illustrate exemplary embodiments and do not limit the scope of the present disclosure.

In this description, in numerical ranges described stepwise, the upper limit or the lower limit of one numerical range may be substituted with an upper limit or a lower limit of a different numerical range also described stepwise. In addition, in any numerical range described in this description, the upper limit or the lower limit of the numerical range may be substituted with a value indicated in Examples.

Each of the components may contain more than one corresponding substances.

When the amount of a component in a composition is described and when there are two or more substances that correspond to that component in the composition, the amount is the total amount of the two or more substances in the composition unless otherwise noted.

The term "step" refers not only to an independent step but also to any feature that attains the expected effect of the step although such a feature may not be clearly distinguishable from other steps.

Electrophotographic Photoreceptor

An electrophotographic photoreceptor (hereinafter may also be referred to as the "photoreceptor") according to an exemplary embodiment includes a conductive substrate, an organic photosensitive layer, and an inorganic protection layer arranged in this order, in which the inorganic protection layer is a layer containing a metal oxide, and the metal oxide contains oxygen atoms, gallium atoms, and aluminum atoms.

The photoreceptor according to this exemplary embodiment serves as an electrophotographic photoreceptor that reduces occurrence of image quality nonuniformity due to the aforementioned features. The reasons for this are presumably as follows.

A typical photoreceptor that includes a conductive substrate, an organic photosensitive layer, and an inorganic protection layer arranged in this order and that includes, as the inorganic protection layer, a layer containing a metal oxide (for example, gallium oxide) may undergo charging potential nonuniformity before and after development due to injection of electrification charges on the photoreceptor into a carrier in the developer during development. As a result, the image quality nonuniformity may occur in a formed image.

In the electrophotographic photoreceptor of the present exemplary embodiment, the inorganic protection layer is a layer containing a metal oxide, and the metal oxide contains oxygen atoms, gallium atoms, and aluminum atoms; presumably, the inclusion of aluminum oxide having a lower electrical conductivity than gallium oxide reduces injection of electrification charges into the carrier in the developer, reduces occurrence of the charge potential nonuniformity before and after development, and improves the capability to reduce image quality nonuniformity in the obtained image.

Presumably thus, the photoreceptor according to this exemplary embodiment serves as an electrophotographic photoreceptor that reduces occurrence of image quality nonuniformity.

The electrophotographic photoreceptor of the present exemplary embodiment will now be described in detail with reference to the drawings. In the drawings, the identical parts are represented by the same reference signs, and redundant descriptions are avoided.

The organic photosensitive layer of the electrophotographic photoreceptor of this exemplary embodiment may contain silica particles.

When the organic photosensitive layer contains silica particles, occurrence of image quality nonuniformity is more easily reduced. The reason for this is presumably that cracking of the inorganic protection layer caused by the underlying layer having a deficient strength is reduced, and generation of color spots is reduced.

Figure 2:
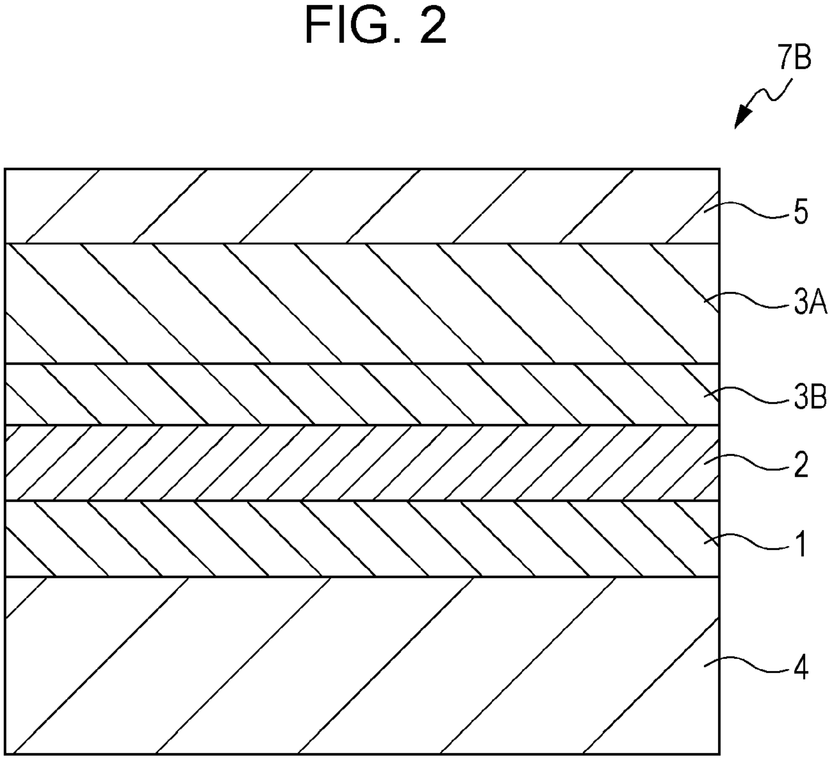
FIG. 2 is a schematic cross-sectional view of one example of another layer structure of an electrophotographic photoreceptor according to the exemplary embodiment.
Figure 3:
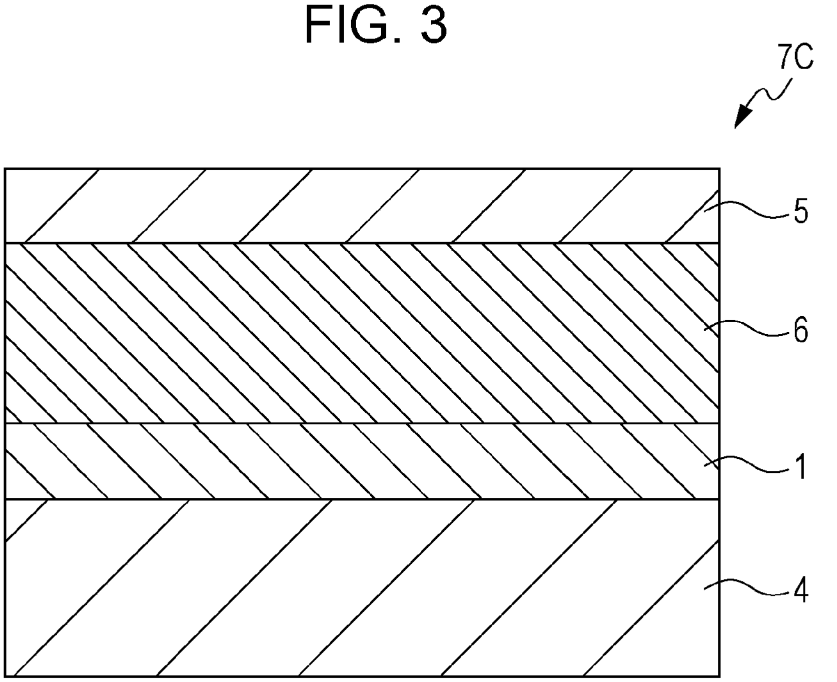
FIG. 3 is a schematic cross-sectional view of one example of another layer structure of an electrophotographic photoreceptor according to one exemplary embodiment.

Examples of the electrophotographic photoreceptor illustrated in FIGS. 1 to 3 in which the organic photosensitive layer contains silica particles are also described.

FIG. 1 is a schematic cross-sectional view of one example of the electrophotographic photoreceptor of the present exemplary embodiment. FIGS. 2 and 3 are schematic cross-sectional views of other examples of the electrophotographic photoreceptor of the present exemplary embodiment.

An electrophotographic photoreceptor 7A illustrated in FIG. 1 is a so-called function-separated photoreceptor (or a multilayer photoreceptor), and has a structure in which an undercoat layer 1 is formed on a conductive substrate 4 and a charge generation layer 2, a charge transport layer 3, and an inorganic protection layer 5 are sequentially formed on the undercoat layer 1. In the electrophotographic photoreceptor 7A, the organic photosensitive layer is constituted by the charge generation layer 2 and the charge transport layer 3.

When the organic photosensitive layer contains silica particles, the charge transport layer 3 may contain at least a charge transport material and silica particles.

An electrophotographic photoreceptor 7B illustrated in FIG. 2 is a function-separated photoreceptor in which the charge generation layer 2 and the charge transport layer 3 are separate as with the electrophotographic photoreceptor 7A illustrated in FIG. 1, but the charge transport layer 3 is further divided into layers having separate functions. An electrophotographic photoreceptor 7C illustrated in FIG. 3 includes one layer (single layer-type organic photosensitive layer 6 (charge generation/charge transport layer)) that contains both a charge generation material and a charge transport material.

The electrophotographic photoreceptor 7B illustrated in FIG. 2 has a structure in which the undercoat layer 1 is disposed on the conductive substrate 4 and a charge generation layer 2, a charge transport layer 3B, a charge transport layer 3A, and an inorganic protection layer 5 are sequentially formed on the undercoat layer 1. In the electrophotographic photoreceptor 7B, the organic photosensitive layer is constituted by the charge transport layer 3A, the charge transport layer 3B, and the charge generation layer 2.

When the organic photosensitive layer contains silica particles, the charge transport layer 3A may contain at least a charge transport material and silica particles. However, the charge transport layer 3B may contain at least a charge transport material but not silica particles.

The electrophotographic photoreceptor 7C illustrated in FIG. 3 has a structure in which the undercoat layer 1 is disposed on the conductive substrate 4, and a single layer-type organic photosensitive layer 6 and an inorganic protection layer 5 are sequentially formed on the undercoat layer 1.

When the organic photosensitive layer contains silica particles, the single layer-type organic photosensitive layer 6 may contain at least a charge generation material, a charge transport material, and silica particles.

The electrophotographic photoreceptors illustrated in FIGS. 1 and 3 do not have to include the undercoat layer 1.

The organic photosensitive layer of the electrophotographic photoreceptor of the present exemplary embodiment may include a charge generation layer, and a charge transport layer that contains at least a charge transport material and silica particles.

When the organic photosensitive layer has this structure, occurrence of image quality nonuniformity is more easily reduced. The reason for this is presumably that cracking of the inorganic protection layer caused by the underlying layer having a deficient strength is reduced, and generation of color spots is reduced.

Individual elements of the electrophotographic photoreceptor 7A illustrated in FIG. 1 will now be described as a representative example.

Conductive Substrate

Examples of the conductive substrate include metal plates, metal drums, and metal belts that contain metals (aluminum, copper, zinc, chromium, nickel, molybdenum, vanadium, indium, gold, platinum, etc.) or alloys (stainless steel etc.). Other examples of the conductive substrate include paper sheets, resin films, and belts coated, vapor-deposited, or laminated with conductive compounds (for example, conductive polymers and indium oxide), metals (for example, aluminum, palladium, and gold), or alloys. Here, “conductive” means having a volume resistivity of less than $10^{13}$ Ωcm.

The surface of the conductive substrate may be roughened to a center-line average roughness Ra of 0.04 μm or more and 0.5 μm or less in order to reduce interference fringes that occur when the electrophotographic photoreceptor used in a laser printer is irradiated with a laser beam. When incoherent light is used as a light source, there is no need to roughen the surface to reduce interference fringes, but roughening the surface reduces generation of defects due to irregularities on the surface of the conductive substrate and thus is desirable for extending the lifetime.

Examples of the surface roughening method include a wet honing method with which an abrasive suspended in water is sprayed onto a conductive substrate, a centerless grinding with which a conductive substrate is pressed against a rotating grinding stone to perform continuous grinding, and an anodization treatment.

Another example of the surface roughening method does not involve roughening the surface of a conductive substrate but involves dispersing a conductive or semi-conductive powder in a resin and forming a layer of the resin on a surface of a conductive substrate so as to create a rough surface by the particles dispersed in the layer.

The surface roughening treatment by anodization involves forming an oxide film on the surface of a conductive substrate by anodization by using a metal (for example, aluminum) conductive substrate as the anode in an electrolyte solution. Examples of the electrolyte solution include a sulfuric acid solution and an oxalic acid solution. However, a porous anodization film formed by anodization is chemically active as is, is prone to contamination, and has resistivity that significantly varies depending on the environment. Thus, a pore-sealing treatment may be performed on the porous anodization film so as to seal fine pores in the oxide film by volume expansion caused by hydrating reaction in pressurized steam or boiling water (a metal salt such as a nickel salt may be added) so that the oxide is converted into a more stable hydrous oxide.

The thickness of the anodization film may be, for example, 0.3 μm or more and 15 μm or less. When the thickness is within this range, a barrier property against injection tends to be exhibited, and the increase in residual potential caused by repeated use tends to be reduced.

The conductive substrate may be subjected to a treatment with an acidic treatment solution or a Boehmite treatment.

The treatment with an acidic treatment solution is, for example, conducted as follows. First, an acidic treatment solution containing phosphoric acid, chromic acid, and hydrofluoric acid is prepared. The blend ratios of phosphoric acid, chromic acid, and hydrofluoric acid in the acidic treatment solution may be, for example, in the range of 10 mass % or more and 11 mass % or less for phosphoric acid, in the range of 3 mass % or more and 5 mass % or less for chromic acid, and in the range of 0.5 mass % or more and 2 mass % or less for hydrofluoric acid; and the total concentration of these acids may be in the range of 13.5 mass % or more and 18 mass % or less. The treatment temperature may be, for example, 42° C. or higher and 48° C. or lower. The thickness of the film may be 0.3 μm or more and 15 μm or less.

The Boehmite treatment is conducted by immersing a conductive substrate in pure water at 90° C. or higher and 100° C. or lower for 5 to 60 minutes or by bringing a conductive substrate into contact with pressurized steam at 90° C. or higher and 120° C. or lower for 5 to 60 minutes. The thickness of the film may be 0.1 μm or more and 5 μm or less. The Boehmite-treated body may be further anodized by using an electrolyte solution, such as adipic acid, boric acid, a borate salt, a phosphate salt, a phthalate salt, a maleate salt, a benzoate salt, a tartrate salt, or a citrate salt, that has low film-dissolving power.

Undercoat Layer

The undercoat layer is, for example, a layer that contains inorganic particles and a binder resin.

An example of the inorganic particles is inorganic particles having a powder resistance (volume resistivity) of $10^2$ Ω·cm or more and $10^{11}$ Ω·cm or less.

As the inorganic particles having this resistance value, for example, metal oxide particles such as tin oxide particles, titanium oxide particles, zinc oxide particles, or zirconium oxide particles may be used, and, in particular, zinc oxide particles may be used.

The specific surface area of the inorganic particles measured by the BET method may be, for example, 10 $m^2/g$ or more.

The volume-average particle diameter of the inorganic particles may be, for example, 50 nm or more and 2000 nm or less (or may be 60 nm or more and 1000 nm or less).

The amount of the inorganic particles contained relative to the binder resin is, for example, preferably 10 mass % or more and 80 mass % or less and more preferably 40 mass % or more and 80 mass % or less.

The inorganic particles may be surface-treated. A mixture of two or more inorganic particles subjected to different surface treatments or having different particle diameters may be used.

Examples of the surface treatment agent include a silane coupling agent, a titanate coupling agent, an aluminum coupling agent, and a surfactant. In particular, a silane coupling agent is preferable, and an amino-group-containing silane coupling agent is more preferable.

Examples of the amino-group-containing silane coupling agent include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

Two or more silane coupling agents may be mixed and used. For example, an amino-group-containing silane coupling agent may be used in combination with an additional silane coupling agent. Examples of this additional silane coupling agent include, but are not limited to, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

The surface treatment method that uses a surface treatment agent may be any known method, for example, may be a dry method or a wet method.

The treatment amount of the surface treatment agent may be, for example, 0.5 mass % or more and 10 mass % or less relative to the inorganic particles.

Here, from the viewpoint of enhancing the long-term stability of electrical properties and the carrier-blocking properties, the undercoat layer may contain an electron-accepting compound (acceptor compound) along with the inorganic particles.

Examples of the electron-accepting compound include electron transport substances, such as quinone compounds such as chloranil and bromanil; tetracyanoquinodimethane compounds; fluorenone compounds such as 2,4,7-trinitrofluorenone and 2,4,5,7-tetranitro-9-fluorenone; oxadiazole compounds such as 2-(4-biphenyl)-5-(4-t-butylphenyl)-1,3,4-oxadiazole, 2,5-bis (4-naphthyl)-1,3,4-oxadiazole, and 2,5-bis(4-diethylaminophenyl)-1,3,4-oxadiazole; xanthone compounds; thiophene compounds; diphenoquinone compounds such as 3,3',5,5'-tetra-t-butyldiphenoquinone; and benzophenone compounds.

In particular, a compound having an anthraquinone structure may be used as the electron-accepting compound. Examples of the compound having an anthraquinone structure include hydroxyanthraquinone compounds, aminoanthraquinone compounds, and aminohydroxyanthraquinone compounds, and more specific examples thereof include anthraquinone, alizarin, quinizarin, anthrarufin, and purpurin.

The electron-accepting compound may be dispersed in the undercoat layer along with the inorganic particles, or may be attached to the surfaces of the inorganic particles.

Examples of the method for attaching the electron-accepting compound onto the surfaces of the inorganic particles include a dry method and a wet method.

The dry method is, for example, a method with which, while inorganic particles are stirred with a mixer or the like having a large shear force, an electron-accepting compound as is or dissolved in an organic solvent is added dropwise or sprayed along with dry air or nitrogen gas so as to cause the electron-accepting compound to attach to the surfaces of the inorganic particles. When the electron-accepting compound is added dropwise or sprayed, the temperature may be equal to or lower than the boiling point of the solvent. After the electron-accepting compound is added dropwise or sprayed, baking may be further conducted at 100° C. or higher. The temperature and time for baking are not particularly limited as long as the electrophotographic properties are obtained.

The wet method is, for example, a method with which, while inorganic particles are dispersed in a solvent by stirring, ultrasonically, or by using a sand mill, an attritor, or a ball mill, the electron-accepting compound is added, followed by stirring or dispersing, and then the solvent is removed to cause the electron-accepting compound to attach to the surfaces of the inorganic particles. The solvent is removed by, for example, filtration or distillation. After removing the solvent, baking may be further conducted at 100° C. or higher. The temperature and time for baking are not particularly limited as long as the electrophotographic properties are obtained. In the wet method, the moisture contained in the inorganic particles may be removed before adding the electron-accepting compound; for example, the moisture may be removed by stirring and heating the inorganic particles in a solvent or by boiling together with the solvent.

Attaching the electron-accepting compound may be conducted before, after, or simultaneously with the surface treatment of the inorganic particles by a surface treatment agent.

The amount of the electron-accepting compound contained relative to the inorganic particles may be, for example, 0.01 mass % or more and 20 mass % or less, and is preferably 0.01 mass % or more and 10 mass % or less.

Examples of the binder resin used in the undercoat layer include known materials such as known polymer compounds such as acetal resins (for example, polyvinyl butyral), polyvinyl alcohol resins, polyvinyl acetal resins, casein resins, polyamide resins, cellulose resins, gelatin, polyurethane resins, polyester resins, unsaturated polyester resins, methacrylic resins, acrylic resins, polyvinyl chloride resins, polyvinyl acetate resins, vinyl chloride-vinyl acetate-maleic anhydride resins, silicone resins, silicone-alkyd resins, urea resins, phenolic resins, phenol-formaldehyde resins, melamine resins, urethane resins, alkyd resins, and epoxy resins; zirconium chelate compounds; titanium chelate compounds; aluminum chelate compounds; titanium alkoxide compounds; organic titanium compounds; and silane coupling agents.

Other examples of the binder resin used in the undercoat layer include charge transport resins that have charge transport groups, and conductive resins (for example, polyaniline).

Among these, a resin that is insoluble in the coating solvent in the overlying layer is suitable as the binder resin used in the undercoat layer, and examples of the particularly suitable resin include thermosetting resins such as a urea resin, a phenolic resin, a phenol-formaldehyde resin, a melamine resin, a urethane resin, an unsaturated polyester resin, an alkyd resin, and an epoxy resin; and a resin obtained by a reaction between a curing agent and at least one resin selected from the group consisting of a polyamide resin, a polyester resin, a polyether resin, a methacrylic resin, an acrylic resin, a polyvinyl alcohol resin, and a polyvinyl acetal resin.

When two or more of these binder resins are used in combination, the mixing ratios are set as necessary.

The undercoat layer may contain various additives to improve electrical properties, environmental stability, and image quality.

Examples of the additives include known materials such as electron transport pigments based on polycyclic condensed materials and azo materials, zirconium chelate compounds, titanium chelate compounds, aluminum chelate compounds, titanium alkoxide compounds, organic titanium compounds, and silane coupling agents. The silane coupling agent is used to surface-treat the inorganic particles as mentioned above, but may be further added as an additive to the undercoat layer.

Examples of the silane coupling agent that serves as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compounds include zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelate compounds include tetraisopropyl titanate, tetra-n-butyl titanate, butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compounds include aluminum isopropylate, monobutoxyaluminum diisopropylate, aluminum butyrate, diethylacetoacetate aluminum diisopropylate, and aluminum tris(ethylacetoacetate).

These additives may be used alone, or two or more compounds may be used as a mixture or a polycondensation product.

The undercoat layer may have a Vickers hardness of 35 or more.

In order to suppress moire images, the surface roughness (ten-point average roughness) of the undercoat layer may be adjusted to be in the range of 1/(4n) (n represents the refractive index of the overlying layer) to ½ of λ representing the laser wavelength used for exposure.

In order to adjust the surface roughness, resin particles and the like may be added to the undercoat layer. Examples of the resin particles include silicone resin particles and crosslinking polymethyl methacrylate resin particles. The surface of the undercoat layer may be polished to adjust the surface roughness. Examples of the polishing method include buff polishing, sand blasting, wet honing, and grinding.

The undercoat layer may be formed by any known method, and, for example, may be formed by preparing a undercoat-layer-forming solution by adding the above-mentioned components to a solvent, forming a coating film of this solution, and drying and, if needed, heating the coating film.

Examples of the solvent used for preparing the undercoat layer-forming solution include known organic solvents, such as alcohol solvents, aromatic hydrocarbon solvents, halogenated hydrocarbon solvents, ketone solvents, ketone alcohol solvents, ether solvents, and ester solvents.

Specific examples of the solvent include common organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method for dispersing inorganic particles in preparing the undercoat layer-forming solution include known methods that use a roll mill, a ball mill, a vibrating ball mill, an attritor, a sand mill, a colloid mill, and a paint shaker.

Examples of the method for applying the undercoat layer-forming solution to the conductive substrate include common methods such as a blade coating method, a wire bar coating method, a spray coating method, a dip coating method, a bead coating method, an air knife coating method, and a curtain coating method.

The thickness of the undercoat layer is preferably set within the range of 15 μm or more, and more preferably within the range of 20 μm or more and 50 μm or less.

Intermediate Layer

Although not illustrated in the drawings, an intermediate layer may be further provided between the undercoat layer and the organic photosensitive layer.

The intermediate layer is, for example, a layer that contains a resin. Examples of the resin used in the intermediate layer include polymer compounds such as acetal resins (for example, polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may contain an organometal compound. Examples of the organometal compound used in the intermediate layer include organometal compounds containing metal atoms such as zirconium, titanium, aluminum, manganese, and silicon.

These compounds used in the intermediate layer may be used alone, or two or more compounds may be used as a mixture or a polycondensation product.

In particular, the intermediate layer may be a layer that contains an organometal compound that contains zirconium atoms or silicon atoms.

The intermediate layer may be formed by any known method, and, for example, may be formed by preparing an intermediate-layer-forming solution by adding the above-mentioned components to a solvent, forming a coating film of this solution, and drying and, if needed, heating the coating film.

Examples of the application method for forming the intermediate layer include common methods such as a dip coating method, a lift coating method, a wire bar coating method, a spray coating method, a blade coating method, a knife coating method, and a curtain coating method.

The thickness of the intermediate layer may be set within the range of, for example, 0.1 μm or more and 3 μm or less. The intermediate layer may be used as the undercoat layer.

Charge Generation Layer

The charge generation layer is, for example, a layer that contains a charge generation material and a binder resin. The charge generation layer may be a vapor deposited layer of a charge generation material. The vapor deposited layer of the charge generation material may be used when an incoherent light source such as a light emitting diode (LED) or an organic electro-luminescence (EL) image array is used.

Examples of the charge generation material include azo pigments such as bisazo and trisazo pigments; fused-ring aromatic pigments such as dibromoanthanthrone; perylene pigments; pyrrolopyrrole pigments; phthalocyanine pigments; zinc oxide; and trigonal selenium.

Among these, in order to be compatible to the near-infrared laser exposure, a metal phthalocyanine pigment or a metal-free phthalocyanine pigment may be used as the charge generation material. Specific examples thereof include hydroxygallium phthalocyanine; chlorogallium phthalocyanine; dichlorotin phthalocyanine; and titanyl phthalocyanine.

In order to be compatible to the near ultraviolet laser exposure, the charge generation material may be a fused-ring aromatic pigment such as dibromoanthanthrone, a thioindigo pigment, a porphyrazine compound, zinc oxide, trigonal selenium, a bisazo pigment, or the like.

When an incoherent light source, such as an LED or an organic EL image array having an emission center wavelength in the range of 450 nm or more and 780 nm or less, is used, the charge generation material described above may be used; however, from the viewpoint of the resolution, when the photosensitive layer is as thin as 20 μm or less, the electric field intensity in the photosensitive layer is increased, charges injected from the substrate are decreased, and image defects known as black spots tend to occur. This is particularly noticeable when a charge generation material, such as trigonal selenium or a phthalocyanine pigment, that is of a p-conductivity type and easily generates dark current is used.

In contrast, when an n-type semiconductor, such as a fused-ring aromatic pigment, a perylene pigment, or an azo pigment, is used as the charge generation material, dark current rarely occurs and, even when the thickness is small, image defects known as black spots can be suppressed.

Determination of the n-type is performed by a common time-of-flight method and by the polarity of the flowing photocurrent, and a material in which electrons rather than holes are likely to flow as a carrier is determined to be of an n-type.

The binder resin used in the charge generation layer is selected from a wide range of insulating resins. Alternatively, the binder resin may be selected from organic photoconductive polymers, such as poly-N-vinylcarbazole, polyvinyl anthracene, polyvinyl pyrene, and polysilane.

Examples of the binder resin include, polyvinyl butyral resins, polyarylate resins (polycondensates of bisphenols and aromatic dicarboxylic acids etc.), polycarbonate resins, polyester resins, phenoxy resins, vinyl chloride-vinyl acetate copolymers, polyamide resins, acrylic resins, polyacrylamide resins, polyvinyl pyridine resins, cellulose resins, urethane resins, epoxy resins, casein, polyvinyl alcohol resins, and polyvinyl pyrrolidone resins. Here, “insulating” means having a volume resistivity of $10^{13}$ Ω·cm or more.

These binder resins may be used alone or in combination as a mixture.

The blend ratio of the charge generation material to the binder resin may be 10:1 to 1:10 in terms of mass ratio.

The charge generation layer may contain other known additives.

The charge generation layer may be formed by any known method, and, for example, may be formed by preparing a charge generation layer-forming solution by adding the above-mentioned components to a solvent, forming a coating film of this solution, and drying and, if needed, heating the coating film. The charge generation layer may be a vapor deposited layer of a charge generation material. The charge generation layer may be formed by vapor deposition particularly when a fused-ring aromatic pigment or a perylene pigment is used as the charge generation material.

Specific examples of the solvent for preparing the charge generation-layer-forming solution include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in combination as a mixture.

In order to disperse particles (for example, a charge generation material) in the charge generation layer-forming solution, a media disperser such as a ball mill, a vibrating ball mill, an attritor, a sand mill, or a horizontal sand mill, or a media-less disperser such as stirrer, an ultrasonic disperser, a roll mill, or a high-pressure homogenizer is used, for example. Examples of the high-pressure homogenizer include a collision-type homogenizer in which a dispersion in a high-pressure state is dispersed through liquid-liquid collision or liquid-wall collision, and a penetration-type homogenizer in which a fluid in a high-pressure state is caused to penetrate through fine channels.

In dispersing, it is effective to set the average particle diameter of the charge generation material in the charge generation layer-forming solution to 0.5 μm or less, preferably 0.3 μm or less, and more preferably 0.15 μm or less.

Examples of the method for applying the charge generation layer-forming solution to the undercoat layer (or the intermediate layer) include common methods such as a blade coating method, a wire bar coating method, a spray coating method, a dip coating method, a bead coating method, an air knife coating method, and a curtain coating method.

The thickness of the charge generation layer is preferably set within the range of 0.1 μm or more and 5.0 μm or less, and more preferably within the range of 0.2 μm or more and 2.0 μm or less.

Charge Transport Layer

The charge transport layer is, for example, a layer that contains a charge transport material and a binder resin. The charge transport layer may contain a polymer charge transport material.

Examples of the charge transport material include electron transport compounds such as quinone compounds such as p-benzoquinone, chloranil, bromanil, and anthraquinone; tetracyanoquinodimethane compounds; fluorenone compounds such as 2,4,7-trinitrofluorenone; xanthone compounds; benzophenone compounds; cyanovinyl compounds; and ethylene compounds. Other examples of the charge transport material include hole transport compounds such as triarylamine compounds, benzidine compounds, arylalkane compounds, aryl-substituted ethylene compounds, stylbene compounds, anthracene compounds, and hydrazone compounds. These charge transport materials are used alone or in combination, and are not limiting.

From the viewpoint of charge mobility, the charge transport material may be a triarylamine derivative represented by structural formula (a-1) below and a benzidine derivative represented by structural formula (a-2) below.

(a-1)

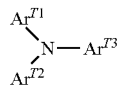

In structural formula (a-1), $Ar^{T1}$, $Ar^{T2}$ and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent for each of the groups described above include a halogen atom, an alkyl group having 1 to 5 carbon atoms, and an alkoxy group having 1 to 5 carbon atoms. Examples of the substituent for each of the groups described above also include substituted amino groups each of which is substituted with an alkyl group having 1 to 3 carbon atoms.

(a-2)

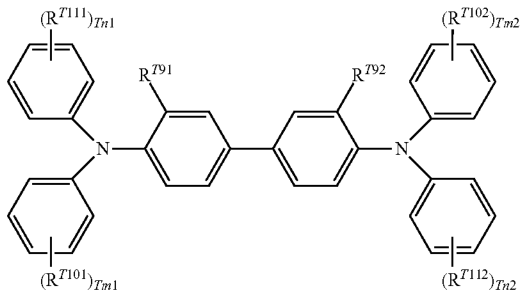

In structural formula (a-2), $R^{T91}$ and $R^{T92}$ each independently represent a hydrogen atom, a halogen atom, an alkyl group having 1 to 5 carbon atoms, or an alkoxy group having 1 to 5 carbon atoms. $R^{T101}$, $R^{T102}$, $R^{T111}$, and $R^{T112}$ each independently represent a halogen atom, an alkyl group having 1 to 5 carbon atoms, an alkoxy group having 1 to 5 carbon atoms, an amino group substituted with an alkyl group having 1 or 2 carbon atoms, a substituted or unsubstituted aryl group, $-C(R^{T12})=C(R^{T13})(R^{T14})$, or $-CH=CH-CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of the substituent for each of the groups described above include a halogen atom, an alkyl group having 1 to 5 carbon atoms, and an alkoxy group having 1 to 5 carbon atoms. Examples of the substituent for each of the groups described above also include substituted amino groups each of which is substituted with an alkyl group having 1 to 3 carbon atoms.

Among the triarylamine derivatives represented by structural formula (a-1) above and the benzidine derivatives represented by structural formula (a-2) above, a triarylamine derivative having "$-C_6H_4-CH{=}CH-CH{=}C(R^{T7})(R^{T8})$" and a benzidine derivative having "$-CH{=}CH-CH{=}C(R^{T15})(R^{T16})$" are particularly preferable from the viewpoint of charge mobility.

Examples of the polymer charge transport material that can be used include known charge transport materials such as poly-N-vinylcarbazole and polysilane. In particular, a polyester polymer charge transport material is preferable. These polymer charge transfer materials may be used alone or each in combination with a binder resin.

Examples of the binder resin used in the charge transport layer include polycarbonate resins, polyester resins, polyarylate resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone alkyd resins, phenol-formaldehyde resins, styrene-alkyd resins, poly-N-vinylcarbazole, and polysilane. Among these, a polycarbonate resin or a polyarylate resin may be used as the binder resin. These binder resins are used alone or in combination.

The blend ratio of the charge transport material to the binder resin may be 10:1 to 1:5 in terms of mass ratio.

The charge transport layer may contain silica particles.

Examples of the silica particles include dry-process silica particles and wet-process silica particles.

Examples of the dry-process silica particles include pyrogenic silica (fumed silica) prepared by burning a silane compound, and deflagration silica particles prepared by deflagration of metal silicon powder.

Examples of the wet-process silica particles include wet-process silica particles obtained by neutralization reaction of sodium silicate and a mineral acid (precipitated silica synthesized and aggregated under alkaline conditions and gel silica particles synthesized and aggregated under acidic conditions), colloidal silica particles obtained by alkalifying and polymerizing acidic silicate (silica sol particles), and sol-gel silica particles obtained by hydrolysis of an organic silane compound (for example, alkoxysilane).

Among these, pyrogenic silica particles having fewer surface silanol groups and a low gap structure may be used as the silica particles from the viewpoint of reducing image defects caused by occurrence of residual potential and other degradations of electrical characteristics (from the viewpoint of reducing degradation of fine-line reproducibility).

The volume-average particle diameter of the silica particles is preferably 20 nm or more and 200 nm or less, more preferably 30 nm or more and 200 nm or less, and yet more preferably 40 nm or more and 150 nm or less.

When the volume-average particle diameter is in the aforementioned range, cracking of the inorganic protection layer and generation of the residual potential are easily reduced.

The volume-average particle diameter is measured by separating the silica particles from the layer, observing 100 primary particles of these silica particles with a scanning electron microscope (SEM) at a magnification of 40000, measuring the longest axis and the shortest axis of each particle by image analysis of the primary particles, and measuring the sphere-equivalent diameter from the intermediate values. The 50% diameter (D50v) in the accumulative frequency of the obtained sphere-equivalent diameters is determined, and assumed to be the volume-average particle diameter of the silica particles.

The silica particles may be surface-treated with a hydrophobizing agent. As a result, the number of silanol groups on the surfaces of the silica particles is decreased, and occurrence of residual potential is easily reduced.

Examples of the hydrophobizing agent include known silane compounds such as chlorosilane, alkoxysilane, and silazane.

Among these, a silane compound having a trimethylsilyl group, a decylsilyl group, or a phenylsilyl group may be used as the hydrophobizing agent from a viewpoint of smoothly reducing occurrence of residual potential. In other words, trimethylsilyl groups, decylsilyl groups, or phenylsilyl groups may be present on the surfaces of the silica particles.

Examples of the silane compound having trimethylsilyl groups include trimethylchlorosilane, trimethylmethoxysilane, and 1,1,1,3,3,3-hexamethyldisilazane.

Examples of the silane compound having decylsilyl groups include decyltrichlorosilane, decyldimethylchlorosilane, and decyltrimethoxysilane.

Examples of the silane compound having phenylsilyl groups include triphenylmethoxysilane and triphenylchlorosilane.

The condensation ratio of hydrophobized silica particles (the ratio of Si—O—Si in the $SiO_4$— bonds in the silica particles, hereinafter this ratio is referred to as "condensation ratio of the hydrophobizing agent") may be, for example, 90% or more, is preferably 91% or more, and is more preferably 95% or more relative to the silanol groups on the surfaces of the silica particles.

When the condensation ratio of the hydrophobizing agent is within the above-described range, the number of silanol groups on the surfaces of the silica particles is decreased, and occurrence of residual potential is easily reduced.

The condensation ratio of the hydrophobizing agent indicates the ratio of condensed silicon relative to all bondable sites of silicon in the condensed portions detected with NMR, and is measured as follows.

First, silica particles are separated from the layer. Separated silica particles are subjected to Si CP/MAS NMR analysis with AVANCE III 400 produced by Bruker, and the peak areas corresponding to the number of SiO substituents are determined; and the values for the disubstituted ($Si(OH)_2(O-Si)_2-$), trisubstituted ($Si(OH)(O-Si)_3-$), and tetrasubstituted ($Si(O-Si)_4-$) are respectively assumed to be Q2, Q3, and Q4, and the condensation ratio of the hydrophobizing agent is calculated from the formula: $(Q2\times2+Q3\times3+Q4\times4)/4\times(Q2+Q3+Q4)$.

The volume resistivity of the silica particles may be, for example, $10^{11}$ Ω·cm or more, is preferably $10^{12}$ Ω·cm or more, and is more preferably $10^{13}$ Ω·cm or more.

When the volume resistivity of the silica particles is within the above-described range, degradation of fine-line reproducibility is reduced.

The volume resistivity of the silica particles is measured as follows. The temperature and humidity of the measurement environment are, respectively, 20° C. and 50% RH.

First, silica particles are separated from the layer. Then, the separated silica particles to be measured are placed on a surface of a circular jig equipped with a 20 $cm^2$ electrode plate so that the silica particles form a silica particle layer having a thickness of about 1 mm or more and 3 mm or less. Another identical 20 $cm^2$ electrode plate is placed on the silica particle layer so as to sandwich the silica particle layer. In order to eliminate gaps between the silica particles, a load of 4 kg is applied onto the electrode plate on the silica particle layer, and then the thickness (cm) of the silica particle layer is measured. The electrodes above and under the hydrophobic silica particle layer are connected to an electrometer and a high-voltage power generator. A high voltage is applied to the two electrodes so that the electric field reaches a particular value, and the current value (A) that flows at this time is read so as to calculate the volume resistivity (Ω·cm) of the silica particles. The calculation formula of the volume resistivity (Ω·cm) of the silica particles is as follows.

Note that in the formula, ρ represents the volume resistivity (Ω·cm) of the hydrophobic silica particles, E represents the applied voltage (V), I represents the current value (A), $I_0$ represents a current value (A) at an applied voltage of 0 V, and L represents the thickness (cm) of the hydrophobic silica particle layer. For evaluation, the volume resistivity at an applied voltage of 1000 V is used.

$$\rho=E\times 20/(I-I_0)/L \quad \text{Formula:}$$

The silica particle content relative to the entire charge transport layer may be, for example, 30 mass % or more and 70 mass % or less, is preferably 40 mass % or more and 70 mass % or less, and is yet more preferably 45 mass % or more and 65 mass % or less.

In addition, the silica particle content may be larger than the charge transport material content.

When the silica particle content is in the aforementioned range, cracking of the inorganic protection layer and generation of the residual potential are easily reduced.

The charge transport layer may contain other known additives.

The charge transport layer may be formed by any known method, and, for example, may be formed by preparing a charge transport layer-forming solution by adding the above-mentioned components to a solvent, forming a coating film of this solution, and drying and, if needed, heating the coating film.

Examples of the solvent used to prepare the charge transport layer-forming solution include common organic solvents such as aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in combination as a mixture.

Examples of the method for applying the charge transport layer-forming solution to the charge generation layer include common methods such as a blade coating method, a wire bar coating method, a spray coating method, a dip coating method, a bead coating method, an air knife coating method, and a curtain coating method.

When particles (for example, silica particles or fluororesin particles) are to be dispersed in the charge transport layer-forming solution, a dispersing method that uses, for example, a media disperser such as a ball mill, a vibrating ball mill, an attritor, a sand mill, or a horizontal sand mill, or a media-less disperser such as stirrer, an ultrasonic disperser, a roll mill, or a high-pressure homogenizer is employed. Examples of the high-pressure homogenizer include a collision-type homogenizer in which a dispersion in a high-pressure state is dispersed through liquid-liquid collision or liquid-wall collision, and a penetration-type homogenizer in which a fluid in a high-pressure state is caused to penetrate through fine channels.

The thickness of the charge transport layer is preferably set within the range of 5 μm or more and 50 μm or less, and more preferably within the range of 10 μm or more and 30 μm or less.

Inorganic Protection Layer

The inorganic protection layer is a layer that contains a metal oxide.

The metal oxide contains oxygen atoms, gallium atoms, and aluminum atoms.

Examples of the metal oxide include gallium oxide, aluminum oxide, zinc oxide, titanium oxide, indium oxide, tin oxide, boron oxide, and mixed crystals thereof.

To control the conductivity type to, for example, n-type, the inorganic protection layer may contain at least one element selected from C, Si, Ge, and Sn. To make a p-type inorganic protection layer, at least one element selected from N, Be, Mg, Ca, and Sr may be contained.

In the inorganic protection layer, the average of the ratio $I_{Al}/(I_{Ga}+I_{Al})$ of the aluminum atomic weight fraction $I_{Al}$ to the total of the gallium atomic weight fraction $I_{Ga}$ and the aluminum atomic weight fraction $I_{Al}$ as measured by X-ray photoelectron spectrometry (hereinafter, the "ratio $I_{Al}/(I_{Ga}+I_{Al})$ of the aluminum atomic weight fraction $I_{Al}$ to the total of the gallium atomic weight fraction $I_{Ga}$ and the aluminum atomic weight fraction $I_{Al}$ as measured by X-ray photoelectron spectrometry" may be simply referred to as the "ratio $I_{Al}/(I_{Ga}+I_{Al})$") is preferably 0.5 or more and 1 or less, more preferably 0.7 or more and 1 or less, and yet more preferably 0.85 or more and 1 or less.

When the average of the ratio $I_{Al}/(I_{Ga}+I_{Al})$ is 0.5 or more, it is presumed that injection of the electrification charges into the carrier in the developer is further reduced. When the average of the ratio $I_{Al}/(I_{Ga}+I_{Al})$ is 1 or less, presumably, degradation of the photoreceptor surface potential after photoreceptor exposure is reduced, and clogging of the generated charges on the inner side with respect to the inorganic protection layer is reduced.

The average of the ratio $I_{Al}/(I_{Ga}+I_{Al})$ is calculated by dividing the average of the aluminum atomic weight fraction $I_{Al}$ described below by the total of the average of the gallium atomic weight fraction $I_{Ga}$ and the average of the aluminum atomic weight fraction $I_{Al}$.

From the viewpoint of the image quality nonuniformity, in the inorganic protection layer, the ratio $(I_O/I_{Ga}+I_{Al})$ of the average of the oxygen atomic weight fraction $I_O$ to the total of the average of the gallium atomic weight fraction $I_{Ga}$ and the average of the aluminum atomic weight fraction $I_{Al}$ is preferably 1 or more and 1.5 or less, more preferably 1.3 or more and 1.5 or less, and yet more preferably 1.35 or more and 1.5 or less.

From the viewpoint of the image quality nonuniformity, in the inorganic protection layer, the average of the gallium atomic weight fraction $I_{Ga}$ is 0% or more and 25% or less, more preferably 0% or more and 15% or less, and yet more preferably 0% or more and 8% or less.

From the viewpoint of the image quality nonuniformity, in the inorganic protection layer, the average of the aluminum atomic weight fraction ratio $I_{Al}$ is preferably 20% or more and 40% or less, more preferably 28% or more and 40% or less, and yet more preferably 34% or more and 40% or less.

From the viewpoint of the image quality nonuniformity, in the inorganic protection layer, the average of the oxygen atomic weight fraction $I_O$ is preferably 50% or more and 60% or less, more preferably 57% or more and 60% or less, and yet more preferably 58% or more and 60% or less.

The average of the gallium atomic weight fraction $I_{Ga}$, the average of the aluminum atomic weight fraction $I_{Al}$, and the average of the oxygen atomic weight fraction $I_O$ are measured by X-ray photoelectron spectroscopy. As the X-ray photoelectron spectrometer, for example, model name JPS-9000MX produced by JEOL Ltd., can be used.

Procedures for calculating the average of the gallium atomic weight fraction $I_{Ga}$, the average of the aluminum atomic weight fraction $I_{Al}$, and the average of the oxygen atomic weight fraction $I_O$ will now be described.

Procedure for Calculating Average of Gallium Atomic Weight Fraction $I_{Ga}$

All elements present in the inorganic protection layer are detected with an X-ray photoelectron spectrometer. Next, the ratio of the gallium element peak area to the total of element peak areas of all elements present in the inorganic protection layer is determined. This measurement is conducted three times at different measurement sites in the inorganic protection layer, and the arithmetic average of the measured gallium element peak areas is assumed to be the average of the gallium atomic weight fraction $I_{Ga}$.

Procedure for Calculating Average of Aluminum Atomic Weight Fraction $I_{Al}$

All elements present in the inorganic protection layer are detected with an X-ray photoelectron spectrometer. Next, the ratio of the aluminum element peak area to the total of element peak areas of all elements present in the inorganic protection layer is determined. This measurement is conducted three times at different measurement sites in the inorganic protection layer, and the arithmetic average of the measured aluminum element peak areas is assumed to be the average of the aluminum atomic weight fraction $I_{Al}$.

Average of Oxygen Atomic Weight Fraction $I_O$

All elements present in the inorganic protection layer are detected with an X-ray photoelectron spectrometer. Next, the ratio of the oxygen element peak area to the total of element peak areas of all elements present in the inorganic protection layer is determined. This measurement is conducted three times at different measurement sites in the inorganic protection layer, and the arithmetic average of the measured oxygen element peak areas is assumed to be the average of the oxygen atomic weight fraction $I_O$.

The inorganic protection layer may have a first region present on an outer peripheral surface side and a second region that is closer to the conductive substrate than the first region is to the conductive substrate, and the ratio $I_{Al}/(I_{Ga}+I_{Al})$ of the aluminum atomic weight fraction $I_{Al}$ to the total of the gallium atomic weight fraction $I_{Ga}$ and the aluminum atomic weight fraction $I_{Al}$ as measured by X-ray photoelectron spectroscopy may be larger in the second region than in the first region.

When the inorganic protection layer has such features, occurrence of image quality nonuniformity is further reduced. The reasons for this are presumably as follows.

When the aluminum oxide content in the photoreceptor surface is reduced to an appropriate level, occurrence of the image quality nonuniformity caused by film deterioration of the inorganic protection layer is reduced.

From the viewpoint of the image quality nonuniformity, the difference between the ratio $I_{Al}/(I_{Ga}+I_{Al})$ of the second region and the ratio $I_{Al}/(I_{Ga}+I_{Al})$ of the first region (in other words, (ratio $I_{Al}/(I_{Ga}+I_{Al})$ of second region)−(ratio $I_{Al}/(I_{Ga}+I_{Al})$ of first region)) is preferably 0.05 or more and 0.5 or less, more preferably 0.15 or more and 0.5 or less, and yet more preferably 0.3 or more and 0.5 or less.

The ratio $I_{Al}/I_{Ga}$ of the first region is measured as follows.

The outer peripheral surface-side surface of the inorganic protection layer is measured with an X-ray photoelectron spectrometer (the same X-ray photoelectron spectrometer described above can be used), the number of atoms is determined for each element from the spectra of the atoms measured, and the gallium atomic weight relative to the total atomic weight is calculated and assumed to be the gallium atomic weight fraction $I_{Ga}$. Moreover, the aluminum atomic weight relative to the total atomic weight is calculated and assumed to be the aluminum atomic weight fraction $I_{Al}$. The calculated aluminum atomic weight fraction $I_{Al}$ is divided by the gallium atomic weight fraction $I_{Ga}$ to obtain the ratio $I_{Al}/I_{Ga}$ of the first region.

The ratio $I_{Al}/(I_{Ga}+I_{Al})$ of the second region is measured as follows.

The inorganic protection layer is etched with argon down to the second region, the surface of the etched region is measured with an X-ray photoelectron spectrometer, the number of atoms is determined for each element from the spectra of the atoms measured, and the gallium atomic weight relative to the total atomic weight is calculated and assumed to be the gallium atomic weight fraction $I_{Ga}$. Moreover, the aluminum atomic weight relative to the total atomic weight is calculated and assumed to be the aluminum atomic weight fraction $I_{Al}$. The calculated aluminum atomic weight fraction $I_{Al}$ is divided by the total of the gallium atomic weight fraction $I_{Ga}$ and the aluminum atomic weight fraction $I_{Al}$ to obtain the ratio $I_{Al}/(I_{Ga}+I_{Al})$ of the second region.

The average thickness of the second region may be larger than the average thickness of the first region.

When the inorganic protection layer has such a structure, occurrence of image quality nonuniformity is further reduced. The reasons for this are presumably as follows.

By reducing the image deletion on the photoreceptor surface caused by deteriorated material and by decreasing the electric conduction in the inorganic protection layer as a whole, charge injection toward the developing machine is reduced.

The average thickness of the first region is preferably 0.1 μm or more and 3 μm or less, more preferably 0.5 μm or more and 2.5 μm or less, and yet more preferably 1 μm or more and 2 μm or less.

The average thickness of the second region is preferably 3 μm or more and 10 μm or less, more preferably 4 μm or more and 8 μm or less, and yet more preferably 5 μm or more and 7 μm or less.

The average thickness of the first region is the difference between a film-formed portion and a non-film-formed portion when the film constituting the first region is formed alone, and the same applies to the average thickness of the second region. The thickness is measured with a surface texture and contour measuring instrument. For example, SURFCOM 2800 G produced by TOKYO SEIMITSU CO., LTD., can be used as the surface texture and contour measuring instrument.

The thickness of the inorganic protection layer is preferably 2 μm or more and 10 μm or less and more preferably 4 μm or more and 8 μm or less.

Method for Forming Inorganic Protection Layer

Next, a method for forming the aforementioned inorganic protection layer is described.

A known gas-phase film forming method such as a plasma chemical vapor deposition (CVD) method, an organometal gas-phase growth method, a molecular beam epitaxy method, a vapor deposition method, or a sputtering method is employed to form the inorganic protection layer.

Figure 4A:
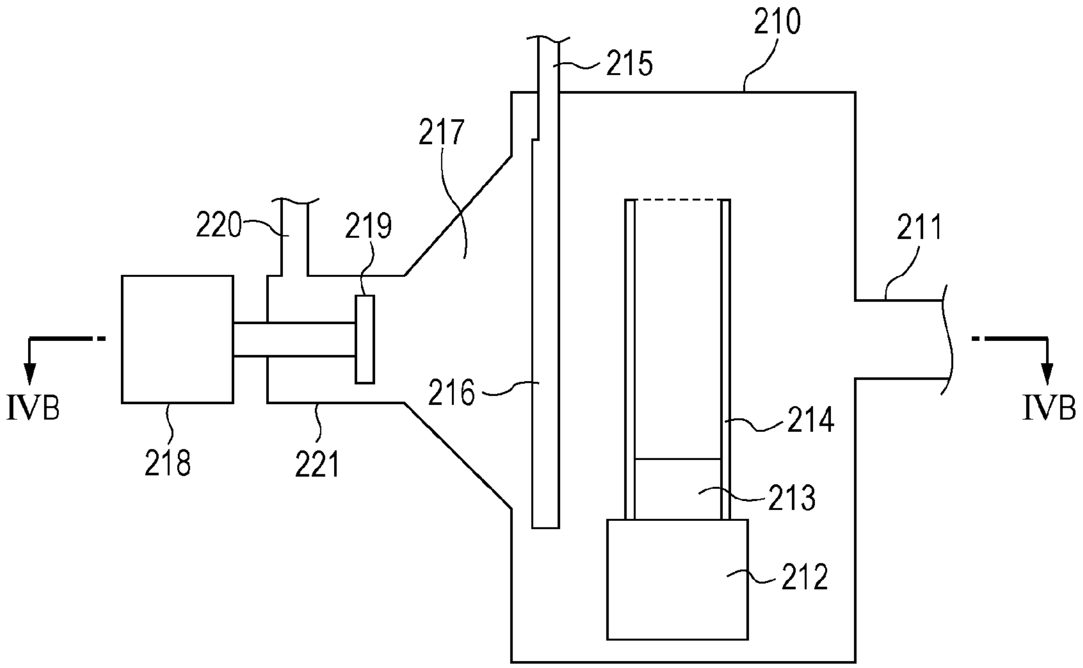
FIGS. 4A and 4B are each a schematic diagram of one example of a film forming apparatus used in forming an inorganic protection layer of the electrophotographic photoreceptor of the exemplary embodiment.
Figure 4B:
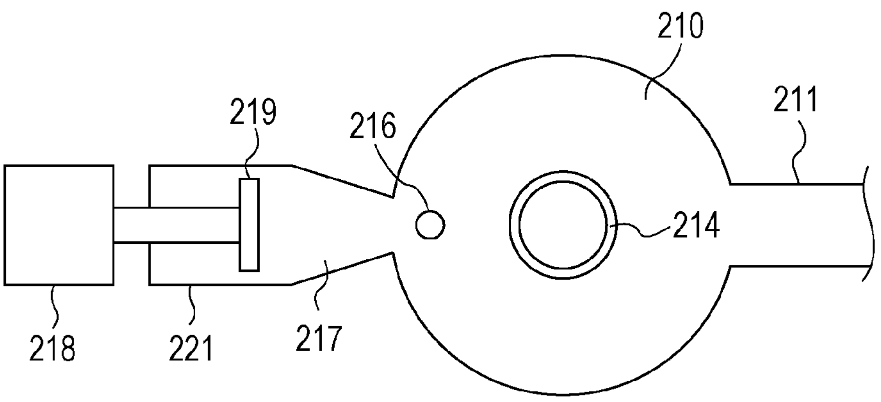

FIGS. 4A and 4B are each a schematic diagram illustrating one example of a film-forming apparatus used to form an inorganic protection layer of the electrophotographic photoreceptor of the exemplary embodiment, in which FIG. 4A is a schematic sectional view of the film forming apparatus as viewed from a side surface, and FIG. 4B is a schematic sectional view of the film forming apparatus illustrated in FIG. 4A taken along line IVB-IVB. In FIGS. 4A and 4B, reference numeral 210 denotes a deposition chamber, 211 denotes an exhaust port, 212 denotes a substrate rotating unit, 213 denotes a substrate supporting member, 214 denotes a substrate, 215 denotes a gas inlet duct, 216 denotes a shower nozzle having an opening through which gas, which is introduced from the gas inlet duct 215, is jet out, 217 denotes a plasma diffusing area, 218 denotes a high-frequency power supply unit, 219 denotes a flat plate electrode, 220 denotes a gas inlet duct, and 221 denotes a high-frequency discharge tube unit.

In the film forming apparatus illustrated in FIGS. 4A and 4B, the exhaust port 211 connected to a vacuum evacuator (not illustrated) is installed on one end of the deposition chamber 210, and a plasma generator constituted by the high-frequency power supply unit 218, the flat plate electrode 219, and the high-frequency discharge tube unit 221 is installed on the side opposite to the side where the exhaust port 211 of the deposition chamber 210 is formed.

This plasma generator is constituted by the high-frequency discharge tube unit 221, the flat plate electrode 219 installed inside the high-frequency discharge tube unit 221 and having a discharge surface provided on the exhaust port 211 side, and the high-frequency power supply unit 218 disposed outside the high-frequency discharge tube unit 221 and connected to the surface of the flat plate electrode 219 opposite from the discharge surface. The gas inlet duct 220 for supplying gas into the interior of the high-frequency discharge tube unit 221 is connected to the high-frequency discharge tube unit 221, and the other end of the gas inlet duct 220 is connected to a first gas supply source not illustrated in the drawing.

Figure 5:
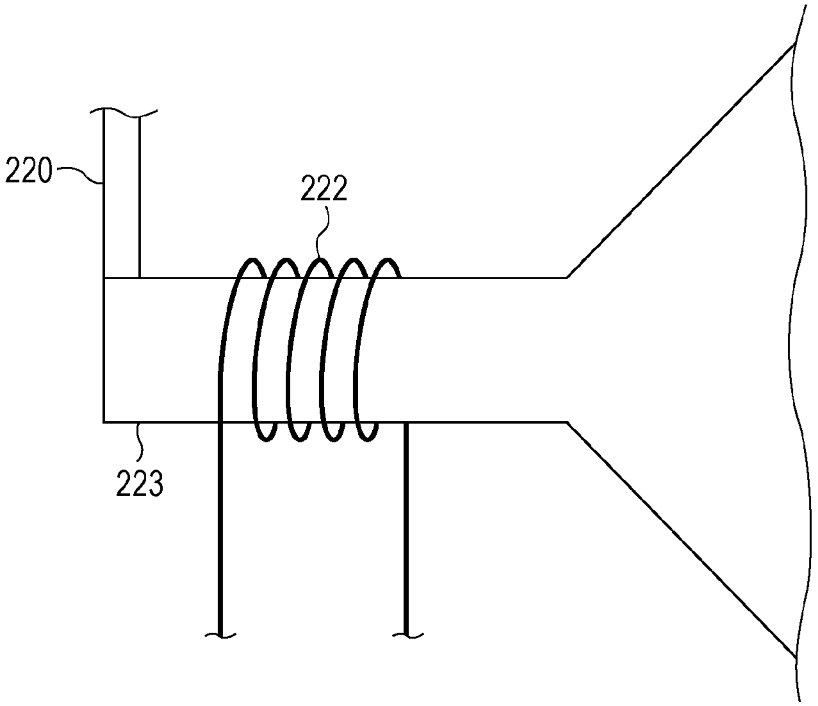
FIG. 5 is a schematic diagram of one example of a plasma generator used in forming the inorganic protection layer of the electrophotographic photoreceptor of the exemplary embodiment.

Instead of the plasma generator installed in the film forming apparatus illustrated in FIGS. 4A and 4B, a plasma generator illustrated in FIG. 5 may be used. FIG. 5 is a schematic diagram illustrating another example of the plasma generator used in the film forming apparatus illustrated in FIGS. 4A and 4B, and is a side view of the plasma generator. In FIG. 5, reference numeral 222 denotes a high-frequency coil, 223 denotes a quartz tube, and 220 denotes the same part as that illustrated in FIGS. 4A and 4B. The plasma generator is constituted by the quartz tube 223 and the high-frequency coil 222 installed along the outer peripheral surface of the quartz tube 223. One end of the quartz tube 223 is connected to the deposition chamber 210 (not illustrated in FIGS. 4A and 4B). The other end of the quartz tube 223 is connected to the gas inlet duct 220 through which gas is introduced into the quartz tube 223.

In FIGS. 4A and 4B, a rod-shaped shower nozzle 216 extending along the discharge surface is connected to the discharge surface side of the flat plate electrode 219, one end of the shower nozzle 216 is connected to the gas inlet duct 215, and the gas inlet duct 215 is connected to a second gas supply source (not illustrated in the drawing) disposed outside the deposition chamber 210.

In the deposition chamber 210, the substrate rotating unit 212 is installed, and a cylindrical substrate 214 is configured to be attachable to the substrate rotating unit 212 via the substrate supporting member 213 so that the longitudinal direction of the shower nozzle 216 and the axis direction of the substrate 214 face each other. In forming the film, the substrate rotating unit 212 is rotated so that the substrate 214 is rotated in the circumferential direction. The substrate 214 is, for example, a multilayer body in which layers up to the photosensitive layer have been stacked in advance or a multilayer body in which layers up to the second region have been formed on a photosensitive layer.

The inorganic protection layer is formed as follows, for example.

First, oxygen gas (or helium (He)-diluted oxygen gas), hydrogen ($H_2$) gas, and, if needed, helium (H) gas are introduced into the high-frequency discharge tube unit 221 from the gas inlet duct 220, and 13.56 MHz radio waves are supplied to the flat plate electrode 219 from the high-frequency power supply unit 218. During this process, the plasma diffusing area 217 that radially spreads from the discharge surface side of the flat plate electrode 219 toward the exhaust port 211 side is formed. The gas introduced from the gas inlet duct 220 flows in the deposition chamber 210 from the flat plate electrode 219 side toward the exhaust port 211 side. The flat plate electrode 219 may be surrounded by an earth shield.

Next, trimethyl gallium gas and trimethyl aluminum gas are introduced into the deposition chamber 210 through the gas inlet duct 215 and the shower nozzle 216 located downstream of the flat plate electrode 219, which is an activating unit, so as to form a non-single-crystal film that contains oxygen atoms, gallium atoms, and aluminum atoms on the surface of the substrate 214.

Here, the gallium atomic weight fraction $I_{Ga}$ and the aluminum atomic weight fraction $I_{Al}$ of the inorganic protection layer can be adjusted by adjusting the flow rates of the trimethyl gallium gas and the trimethyl aluminum gas.

The temperature of the surface of the substrate 214 during formation of the inorganic protection layer is preferably 150° C. or lower, more preferably 100° C. or lower, and particularly preferably 30° C. or higher and 100° C. or lower when a multilayer body having a photosensitive layer is used.

Even when the temperature of the surface of the substrate 214 is 150° C. or lower at the time the film formation is started, the temperature may rise to above 150° C. due to plasma; in such a case, the organic photosensitive layer may be damaged by heat, and thus the surface temperature of the substrate 214 may be controlled by considering this possibility.

When an amorphous silicon photoreceptor is used, the temperature of the surface of the substrate 214 during formation of the inorganic protection layer is, for example, 30° C. or higher and 350° C. or lower.

The temperature of the surface of the substrate 214 may be controlled by using one or both of a heating unit and a cooling unit (not illustrated in the drawing), or may be left to naturally rise during the process of discharging. When the substrate 214 is to be heated, a heater may be installed on the inner or outer side of the substrate 214. When the substrate 214 is to be cooled, a gas or liquid for cooling may be circulated on the inner side of the substrate 214.

In order to avoid elevation of the temperature of the surface of the substrate 214 due to discharging, it is effective to adjust high-energy gas flow applied to the surface of the substrate 214. In such a case, conditions such as the gas flow rate, the discharge output, and the pressure are adjusted so as to achieve a target temperature.

A dopant may be added to the inorganic protection layer to control the conductivity type.

Regarding the dopant doping method during film formation, $SiH_3$ or $SnH_4$ in a gas state is used for the n-type, and biscyclopentadienyl magnesium, dimethylcalcium, dimethylstrontium, or the like in a gas state is used for the p-type.

In order to dope the inorganic protection layer with a dopant element, a known method, such as a thermal diffusion method or an ion implantation method, may be employed.

Specifically, for example, gas containing at least one dopant element is introduced into the deposition chamber 210 through the gas inlet duct 215 and the shower nozzle 216 so as to obtain an inorganic protection layer of an n- or p-conductivity type.

For the film forming apparatus illustrated in FIGS. 4A, 4B, and 5, active nitrogen or active hydrogen formed by discharge energy may be independently controlled by installing multiple activation devices, or gas containing both nitrogen and hydrogen atoms, such as $NH_3$, may be used. Furthermore, $H_2$ may be added. The conditions under which active hydrogen are liberated and generated from the organometal compound may be employed.

In this manner, carbon atoms, gallium atoms, nitrogen atoms, hydrogen atoms, aluminum atoms, etc., that have been activated exist in a controlled state on the surface of the substrate 214. The activated hydrogen atoms have an effect of causing desorption molecular forms of hydrogen atoms in the hydrocarbon groups, such as methyl groups and ethyl groups, constituting the organometal compound.

Thus, a hard film (inorganic protection layer) having three-dimensional bonds is formed.

The plasma generators for the film forming apparatus illustrated in FIGS. 4A, 4B, and 5 use a high-frequency oscillator; however, the plasma generator is not limited to this, and, for example, a microwave oscillator or an electrocyclotron resonance-type or helicon plasma-type device may be used. The high-frequency oscillator may be of an induction type or of a capacitance type.

Furthermore, two or more of these devices may be used in combination, or two or more of the same type of devices may be used in combination. In order to suppress temperature elevation of the surface of the substrate 214 due to plasma irradiation, a high-frequency oscillator may be used; and a device that reduces heat irradiation may be provided.

When two or more different types of plasma generators (plasma generating units) are used, discharging may be caused to occur simultaneously at the same pressure. In addition, the difference in pressure may be created between a region where discharging occurs and a region where film formation is performed (portion where the substrate is installed). These devices may be arranged in series with respect to the gas flow formed from the portion where the gas is introduced toward the portion where the gas is discharged in the film forming apparatus; alternatively, all of the devices may be arranged to oppose the film-forming surface of the substrate.

For example, when two types of plasma generators are arranged in series with respect to the gas flow in, for example, the film forming apparatus illustrated in FIGS. 4A and 4B, the shower nozzle 216 is used as an electrode of the second plasma generator to cause discharge in the deposition chamber 210. In such a case, for example, a high-frequency voltage is applied to the shower nozzle 216 via the gas inlet duct 215 so as to induce discharging in the deposition chamber 210 using the shower nozzle 216 as the electrode. Alternatively, instead of using the shower nozzle 216 as the electrode, a cylindrical electrode may be provided between the substrate 214 and the flat plate electrode 219 in the deposition chamber 210, and discharging may be induced in the deposition chamber 210 by using this cylindrical electrode.

When two different plasma generators are used at the same pressure, for example, when a microwave oscillator and a high-frequency oscillator are used, the excitation energy of the excited species can be significantly changed, and thus this is effective for controlling the quality of the film. Discharging may be performed at a pressure near the atmospheric air pressure (70000 Pa or more and 110000 Pa or less). When discharging is to be performed at a pressure near the atmospheric air pressure, He may be used as the carrier gas.

Regarding formation of the inorganic protection layer etc., a typical organometal gas-phase growth method and a molecular beam epitaxy method are used in addition to the aforementioned methods; however, it is effective for decreasing the temperature during film formation by these methods to use activated nitrogen and/or activated hydrogen and activated oxygen. In such a case, the nitrogen raw material to be used is gas such as $N_2$, $NH_3$, $NF_3$, $N_2H_4$, or methylhydrazine, a gasified liquid, or a raw material bubbled with carrier gas. Examples of the oxygen raw material include oxygen, $H_2O$, $CO$, $CO_2$, $NO$, and $N_2O$.

The inorganic protection layer of the present exemplary embodiment is formed by, for example, placing the substrate 214, which includes a substrate and a photosensitive layer thereon, in the deposition chamber 210 and introducing mixed gases having different compositions to continuously form the first region and the second region.

Alternatively, each of the regions (or layers) may be formed independently and separately.

Regarding the film forming conditions, for example, when discharging is performed by high-frequency discharging, the frequency may be in the range of 10 kHz or more and 50 MHz or less in order to perform high-quality film formation at low temperature. The output depends on the size of the substrate and may be in the range of 0.05 W/$cm^2$ or more and 0.5 W/$cm^2$ or less relative to the surface area of the substrate. The speed of rotating the substrate may be in the range of 10 rpm or more and 1000 rpm or less.

Single Layer-Type Photosensitive Layer

A single layer-type photosensitive layer (charge generation/charge transport layer) is, for example, a layer that contains a charge generation material, a charge transport material, and, if necessary, a binder resin and other known additives. These materials are the same as those described in relation to the charge generation layer and the charge transport layer.

The charge generation material content in the single layer-type photosensitive layer relative to the total solid content may be 0.1 mass % or more and 10 mass % or less and is preferably 0.8 mass % or more and 5 mass % or less. The charge transport material content in the single layer-type photosensitive layer relative to the total solid content may be 5 mass % or more and 50 mass % or less.

The method for forming the single layer-type photosensitive layer is the same as the method for forming the charge generation layer or the charge transport layer.

The thickness of the single layer-type photosensitive layer may be, for example, 5 μm or more and 50 μm or less and is preferably 10 μm or more and 40 μm or less.

Image Forming Apparatus (and Process Cartridge)

An image forming apparatus of an exemplary embodiment includes an electrophotographic photoreceptor, a charging device that charges a surface of the electrophotographic photoreceptor, an electrostatic latent image forming device that forms an electrostatic latent image on the charged surface of the electrophotographic photoreceptor, a developing device that develops the electrostatic latent image on the surface of the electrophotographic photoreceptor by using a developer that contains a toner so as to form a toner image, and a transfer device that transfers the toner image onto a surface of a recording medium. The photoreceptor of the present exemplary embodiment described above is used as the electrophotographic photoreceptor.

The image forming apparatus of the exemplary embodiment is applied to a known image forming apparatus, examples of which include an apparatus equipped with a fixing device that fixes the toner image transferred onto the surface of the recording medium; a direct transfer type apparatus with which the toner image formed on the surface of the electrophotographic photoreceptor is directly transferred to the recording medium; an intermediate transfer type apparatus with which the toner image formed on the surface of the electrophotographic photoreceptor is first transferred to a surface of an intermediate transfer body and then the toner image on the surface of the intermediate transfer body is transferred to the surface of the recording medium; an apparatus equipped with a cleaning device that cleans the surface of the electrophotographic photoreceptor after the toner image transfer and before charging; an apparatus equipped with a charge erasing device that erases the charges on the surface of the electrophotographic photoreceptor by applying the charge erasing light after the toner image transfer and before charging; and an apparatus equipped with an electrophotographic photoreceptor heating member that elevates the temperature of the electrophotographic photoreceptor to reduce the relative temperature.

In the intermediate transfer type apparatus, the transfer device includes, for example, an intermediate transfer body having a surface onto which a toner image is to be transferred, a first transfer device that conducts first transfer of the toner image on the surface of the electrophotographic photoreceptor onto the surface of the intermediate transfer body, and a second transfer device that conducts second transfer of the toner image on the surface of the intermediate transfer body onto a surface of a recording medium.

The image forming apparatus of this exemplary embodiment may be of a dry development type or a wet development type (development type that uses a liquid developer).

In the image forming apparatus of the exemplary embodiment, for example, a section that includes the electrophotographic photoreceptor may be configured as a cartridge structure (process cartridge) detachably attachable to the image forming apparatus. A process cartridge equipped with the photoreceptor of the present exemplary embodiment may be used as this process cartridge. The process cartridge may include, in addition to the electrophotographic photoreceptor, at least one selected from the group consisting of a charging device, an electrostatic latent image forming device, a developing device, and a transfer device.

Although some examples of the image forming apparatus of the present exemplary embodiment are described below, these examples are not limiting. Only relevant parts illustrated in the drawings are described, and descriptions of other parts are omitted.

Figure 6:
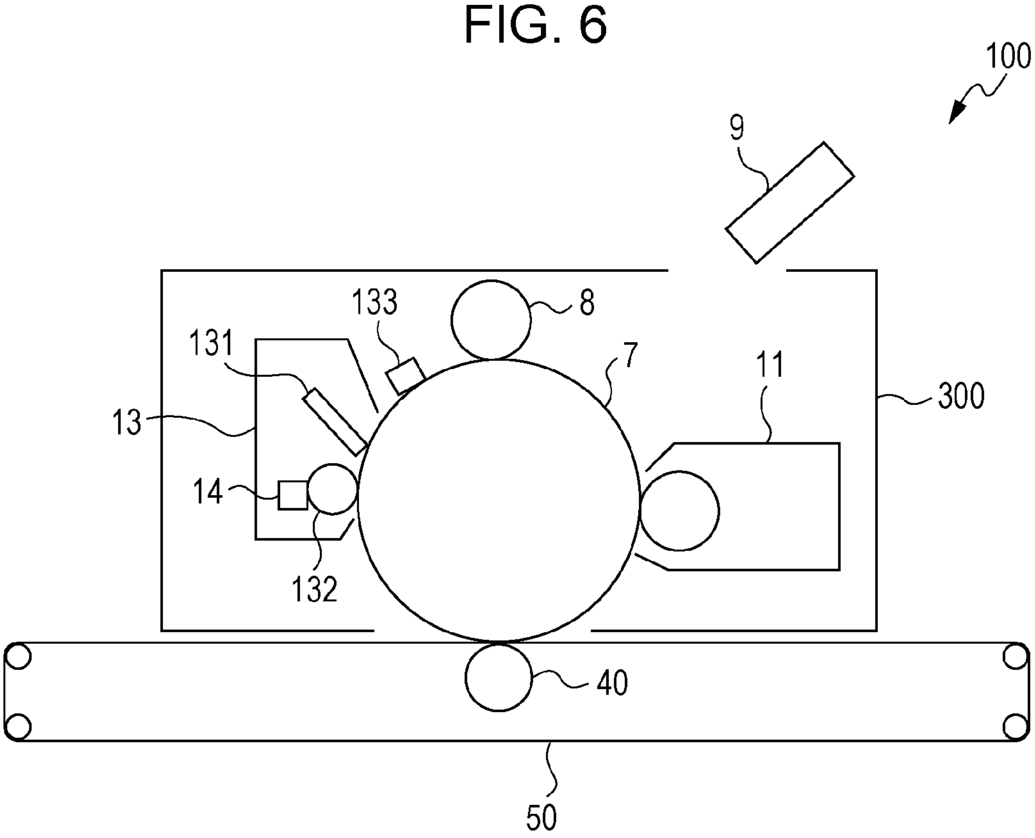
FIG. 6 is a schematic diagram of one example of an image forming apparatus equipped with the electrophotographic photoreceptor according to an exemplary embodiment.

FIG. 6 is a schematic cross-sectional view of one example of an image forming apparatus according to one exemplary embodiment.

As illustrated in FIG. 6, an image forming apparatus 100 of this exemplary embodiment includes a process cartridge 300 equipped with an electrophotographic photoreceptor 7, an exposing device 9 (one example of the electrostatic latent image forming device), a transfer device 40 (first transfer device), and an intermediate transfer body 50. In this image forming apparatus 100, the exposing device 9 is positioned so that light can be applied to the electrophotographic photoreceptor 7 from the opening of the process cartridge 300, the transfer device 40 is positioned to oppose the electrophotographic photoreceptor 7 with the intermediate transfer body 50 therebetween, and the intermediate transfer body 50 has a portion in contact with the electrophotographic photoreceptor 7. Although not illustrated in the drawings, a second transfer device that transfers the toner image on the intermediate transfer body 50 onto a recording medium (for example, a paper sheet) is also provided. The intermediate transfer body 50, the transfer device 40 (first transfer device), and the second transfer device (not illustrated) correspond to examples of the transfer device.

The process cartridge 300 illustrated in FIG. 6 integrates and supports the electrophotographic photoreceptor 7, a charging device 8 (one example of the charging device), a developing device 11 (one example of the developing device), and a cleaning device 13 (one example of the cleaning device) in the housing. The cleaning device 13 has a cleaning blade (one example of the cleaning member) 131, and the cleaning blade 131 is in contact with the surface of the electrophotographic photoreceptor 7. The cleaning member may take a form other than the cleaning blade 131, and may be a conductive or insulating fibrous member that can be used alone or in combination with the cleaning blade 131.

Although an example of the image forming apparatus equipped with a fibrous member 132 (roll) that supplies a lubricant 14 to the surface of the electrophotographic photoreceptor 7 and a fibrous member 133 (flat brush) that assists cleaning is illustrated in FIG. 6, these members are optional.

The features of the image forming apparatus of this exemplary embodiment will now be described.

Charging Device

Examples of the charging device 8 include contact-type chargers that use conductive or semi-conducting charging rollers, charging brushes, charging films, charging rubber blades, and charging tubes. Known chargers such as non-contact-type roller chargers, and scorotron chargers and corotron chargers that utilize corona discharge are also used.

Exposing Device

Examples of the exposing device 9 include optical devices that can apply light, such as semiconductor laser light, LED, or liquid crystal shutter light, into a particular image shape onto the surface of the electrophotographic photoreceptor 7. The wavelength of the light source is to be within the spectral sensitivity range of the electrophotographic photoreceptor. The mainstream wavelength of the semiconductor lasers is near infrared having an oscillation wavelength at about 780 nm. However, the wavelength is not limited to this, and a laser having an oscillation wavelength on the order of 600 nm or a blue laser having an oscillation wavelength of 400 nm or more and 450 nm or less may be used. In order to form a color image, a surface-emitting laser light source that can output multi beams is also effective.

Developing Device

Examples of the developing device 11 include common developing devices that perform development by using a developer in contact or non-contact manner. The developing device 11 is not particularly limited as long as the aforementioned functions are exhibited, and is selected according to the purpose. An example thereof is a known developer that has a function of attaching a one-component developer or a two-component developer to the electrophotographic photoreceptor 7 by using a brush, a roller, or the like. In particular, a development roller that retains the developer on its surface may be used.

The developer used in the developing device 11 may be a one-component developer that contains only a toner or a two-component developer that contains a toner and a carrier. The developer may be magnetic or non-magnetic.

The developer may contain a carrier.

When a developer containing a carrier and a photoreceptor having an inorganic protection layer containing a metal oxide are used, the electrification charges on the photoreceptor are injected into the carrier in the developer during development, and the charging potential nonuniformity before and after development is likely to occur. However, by using a developer containing a carrier and the photoreceptor of the present exemplary embodiment, injection of the electrification charges on the photoreceptor into the carrier in the developer during development is reduced, and the charging potential nonuniformity before and after development is reduced.

The carrier is not particularly limited and may be any known carrier. Examples of the carrier include a coated carrier obtained by covering a surface of a core formed of a magnetic powder with a coating resin; a magnetic powder-dispersed carrier in which a magnetic powder is dispersed and blended in a matrix resin; and a resin-impregnated carrier in which a porous magnetic powder is impregnated with a resin.

The magnetic powder-dispersed carrier and the resin-impregnated carrier may each be constituted by a core formed of a constituent particle of the carrier, and a coating resin covering the core.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, an organosiloxane bond-containing straight silicone resin and modified products thereof, a fluororesin, polyester, polycarbonate, phenolic resin, and epoxy resin.

The coating resin and the matrix resin may each contain other additives such as conductive particles.

Examples of the conductive particles include particles of metals such as gold, silver, and copper, and particles of carbon black, titanium oxide, zinc oxide, tin oxide, barium sulfate, aluminum borate, and potassium titanate.

The volume resistivity of the carrier is preferably $5\times10^{-7}$ Ω·cm or more and $5\times10^{-9}$ Ω·cm or less, more preferably $5\times10^{-8}$ Ω·cm or more and $5\times10^{-9}$ Ω·cm or less, and yet more preferably $1\times10^{-9}$ Ω·cm or more and $5\times10^{-9}$ Ω·cm or less.

Adjusting the volume resistivity of the carrier to $5\times10^{-7}$ Ω·cm or more and $5\times10^{-9}$ Ω·cm or less further reduces injection of the electrification charges on the photoreceptor into the carrier in the developer during development and further reduces occurrence of the charging potential nonuniformity before and after development.

The volume resistivity of the carrier is measured as follows. The temperature and humidity of the measurement environment are, respectively, 20° C. and 50% RH.

The carrier to be measured is placed on a surface of a circular jig equipped with a 20 $cm^2$ electrode plate so that the carrier forms a carrier layer that has a thickness of about 1 mm or more and 3 mm or less. Another identical 20 $cm^2$ electrode plate is placed thereon to sandwich the carrier layer. In order to eliminate gaps between particles of the carrier, a load of 4 kg is applied onto the electrode plate placed on the carrier layer and then the thickness (cm) of the carrier layer is measured. The electrodes above and under the carrier layer are connected to an electrometer and a high-voltage power generator. A high voltage is applied to the two electrodes so that the electric field reaches a particular value, and the current value (A) that flows at this time is read so as to calculate the volume resistivity (Ω·cm) of the carrier. The calculation formula of the volume resistivity (Ω·cm) of the carrier is as follows.

Note that in the formula, ρ represents the volume resistivity (ρcm) of the carrier, E represents the applied voltage (V), I represents the current value (A), $I_0$ represents a current value (A) at an applied voltage of 0 V, and L represents the thickness (cm) of the carrier layer. For evaluation, the volume resistivity at an applied voltage of 1000 V is used.

$$\rho=E\times20/(I-I_0)/L \quad \text{Formula:}$$

Cleaning Device

A cleaning blade type device equipped with a cleaning blade 131 is used as the cleaning device 13.

A fur brush cleaning method or a simultaneous development/cleaning method may be employed instead of the cleaning blade method.

Transfer Device

Examples of the transfer device 40 include contact-type transfer chargers that use belts, rollers, films, rubber blades, etc., and known transfer chargers such as scorotron transfer chargers and corotron transfer chargers that utilize corona discharge.

Intermediate Transfer Body

A belt-shaped member (intermediate transfer belt) that contains semi-conducting polyimide, polyamide imide, polycarbonate, polyarylate, a polyester, a rubber, or the like is used as the intermediate transfer body 50. The form of the intermediate transfer body other than the belt may be a drum.

Figure 7:
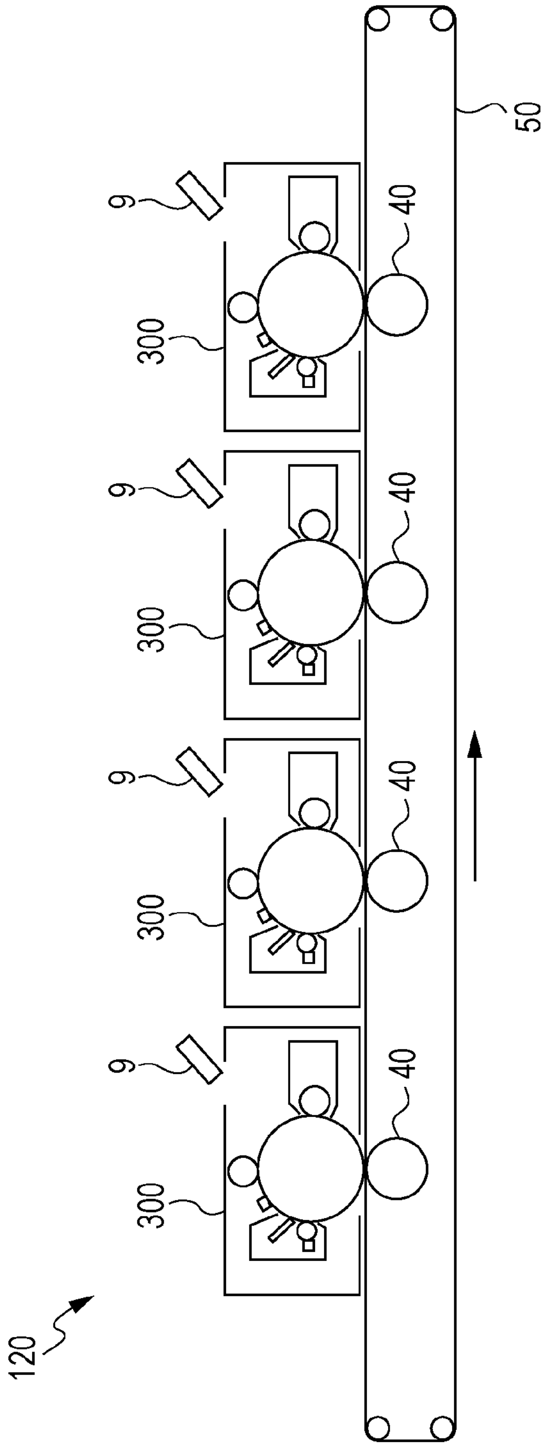
FIG. 7 is a schematic diagram of another example of the image forming apparatus equipped with the electrophotographic photoreceptor according to the exemplary embodiment.

FIG. 7 is a schematic cross-sectional view of one example of an image forming apparatus according to one exemplary embodiment.

An image forming apparatus 120 illustrated in FIG. 7 is a tandem-system multicolor image forming apparatus equipped with four process cartridges 300. In the image forming apparatus 120, four process cartridges 300 are arranged in parallel on the intermediate transfer body 50, and one electrophotographic photoreceptor is used for one color. The image forming apparatus 120 is identical to the image forming apparatus 100 except for the tandem system.

EXAMPLES

Described below are Examples which do not limit the present disclosure in any way. In the description below, "parts" and "%" are all on a mass basis unless otherwise noted.

Preparation of Silica Particles

Preparation of Silica Particles (1)

To 100 parts by mass of untreated (hydrophilic) silica particles (trade name: OX50 produced by AEROSIL CO., LTD.), 30 parts by mass of a hydrophobizing agent, hexamethyldisilazane (trade name: 1,1,1,3,3,3-hexamethyldisilazane produced by Tokyo Chemical Industry Co., Ltd.) is added, the reaction is carried out for 24 hours, and then hydrophobized silica particles are obtained by filtration. These particles are used as silica particles (1).

Example 1

Preparation of Electrophotographic Photoreceptor

First, an undercoat layer, a charge generation layer, a charge transport layer, and an inorganic protection layer are formed in this order on an aluminum (Al) substrate by the procedure described below.

Formation of Undercoat Layer

A solution obtained by stirring and mixing 20 parts by mass of a zirconium compound (trade name: ORGATIX ZC 540 produced by Matsumoto Fine Chemical Co., Ltd.), 2.5 parts by mass of a silane compound (trade name: A1100 produced by Nippon Unicar Company Limited), 10 parts by mass of a polyvinyl butyral resin (trade name: S-LEC BM-S produced by Sekisui Chemical Co., Ltd.), and 45 parts by mass of butanol is applied to a surface of an Al substrate having an outer diameter of 84 mm, and heat-dried at 150° C. for 10 minutes to form an undercoat layer having a thickness of 1.0 μm.

Formation of Charge Generation Layer

Next, a mixture obtained by mixing 1 part by mass of a charge generation material, chlorogallium phthalocyanine, 1 part by mass of polyvinyl butyral (trade name: S-LEC BM-S produced by Sekisui Chemical Co., Ltd.), and 100 parts by mass of n-butyl acetate is dispersed along with glass beads in a paint shaker for 1 hour to obtain a charge generation material-forming dispersion.

This dispersion is applied to the undercoat layer by a dipping method and dried at 100° C. for 10 minutes to form a charge generation layer having a thickness of 0.15 μm.

Formation of Charge Transport Layer

To 20 parts by mass of the silica particles (1), 95 parts by mass of tetrahydrofuran is added, and, while the liquid temperature is kept at 20° C., 10 parts by mass of N,N'-diphenyl-N,N'-bis(3-methylphenyl)-(1,1'-diphenyl)-4,4'-diamine and, as a binder resin, 10 parts by mass of a bisphenol Z polycarbonate resin (viscosity-average molecular weight: 50,000) are added to the resulting mixture, followed by 12 hours of stirring and mixing to obtain a charge transport layer-forming solution.

This charge transport layer-forming solution is applied to the charge generation layer, and dried at 135° C. for 40 minutes to form a charge transport layer having a thickness of 30 μm, thereby obtaining a multilayer body in which the undercoat layer, the charge generation layer, and the charge transport layer are stacked on the Al substrate in that order.

Formation of Inorganic Protection Layer

The inorganic protection layer is formed on the surface of the multilayer body by using the film forming apparatus having the structure illustrated in FIGS. 4A and 4B. Formation of second region First, the multilayer body is placed on the substrate supporting member 213 in the deposition chamber 210 of the film forming apparatus, and the interior of the deposition chamber 210 is vacuum-evacuated through the exhaust port 211 until the pressure reaches 0.1 Pa.

Next, He-diluted 20% oxygen gas (flow rate: 22.5 sccm) and $H_2$ gas (flow rate: 500 sccm) are introduced from the gas inlet duct 220 into the high-frequency discharge tube unit 221 in which the flat plate electrode 219 having a diameter of 85 mm is provided; and, by using the high-frequency power supply unit 218 and a matching circuit (not illustrated in FIG. 3), a 13.56 MHz radiowave is set to an output of 500 W (hereinafter the output of the radiowave is also referred to as the "high-frequency power") and discharging is performed from the flat plate electrode 219 by matching with a tuner. The reflected wave during this process is 0 W.

Next, trimethylgallium gas (flow rate: 0 sccm) and trimethylaluminum gas (flow rate: 7.5 sccm) are introduced from the gas inlet duct 215 through the shower nozzle 216 into the plasma diffusing area 217 inside the deposition chamber 210. During this process, the reaction pressure inside the deposition chamber 210 measured by a Baratron vacuum gauge is 50 Pa.

Under this condition, the multilayer body is rotated at a speed of 500 rpm while conducting film formation for 450 minutes; as a result, a second region having a thickness of 5.0 μm is formed on the surface of the charge transport layer in the multilayer body.

Formation of First Region

Next, the high-frequency discharging is halted, gases are switched to He-diluted 20% oxygen gas (flow rate: 22.5 sccm), $H_2$ gas (flow rate: 500 sccm), trimethylgallium gas (flow rate: 3.8 sccm), and trimethylaluminum gas (flow rate: 3.8 sccm), and high-frequency discharging is resumed at a high-frequency power of 500 W.

Under this condition, while the multilayer body in which the second region has been formed is rotated at a speed of 500 rpm, a film is formed for 115 minutes to form a first region having a thickness of 1.0 μm on the second region.

The inorganic protection layer formed contains, as the metal oxide, gallium oxide and aluminum oxide.

Thus, a multilayer body that has an undercoat layer, a charge generation layer, a charge transport layer, and an inorganic protection layer formed in this order on an aluminum (Al) substrate is obtained.

Examples 2 to 6

A photoreceptor is obtained by the same procedure as in Example 1 except that in "Formation of inorganic protection layer", the flow rates of trimethylgallium gas and trimethylaluminum gas are changed as indicated in Table 1.

Example 7

A photoreceptor is obtained by the same procedure as in Example 1 except that, in "Formation of inorganic protection layer", the flow rates of trimethylgallium gas and trimethylaluminum gas are changed as indicated in Table 1 and that, in "formation of charge transport layer", the silica particles (1) are not added.

Comparative Example 1

A photoreceptor is obtained by the same procedure as in Example 1 except that, in "Formation of inorganic protection layer", the gas introduced into the plasma diffusing area 217 in "Formation of second region" is changed from trimethylgallium gas and trimethylaluminum gas to dimethylzinc (flow rate: 7.5 sccm), and that "Formation of first region" is omitted.

Note that, in Table 1, the "-" signs indicated in the cells under the "Trimethylgallium gas flow rate" column and the "Trimethylaluminum gas flow rate" column under the "Formation of first region" column mean that the inorganic protection layer is formed at a flow rate of trimethylgallium gas and a flow rate of trimethylaluminum gas described in the "Formation of second region" column and that the procedure of forming the first region is omitted.

Furthermore, the "-" signs indicated in the cells under the "Dimethylzinc flow rate" column mean that dimethylzinc is not used.

TABLE 1

| | Formation of second region | | | Formation of first region | |
|---|---|---|---|---|---|
| | Trimethylgallium gas flow rate (sccm) | Trimethylaluminum gas flow rate (sccm) | Dimethylzinc flow rate (sccm) | Trimethylgallium gas flow rate (sccm) | Trimethylaluminum gas flow rate (sccm) |
| Example 1 | 0 | 7.5 | — | 3.8 | 3.8 |
| Comparative Example 1 | — | — | 7.5 | — | — |
| Example 2 | 4.1 | 3.4 | — | — | — |
| Example 3 | 3.8 | 3.8 | — | — | — |
| Example 4 | 2.3 | 5.3 | — | — | — |
| Example 5 | 0.4 | 7.1 | — | 0 | 7.5 |
| Example 6 | 0 | 7.5 | — | 3.8 | 3.8 |
| Example 7 | 0 | 7.5 | — | 3.8 | 3.8 |

Evaluation

Evaluation of Image Quality Nonuniformity

The electrophotographic photoreceptors obtained in Examples and Comparative Example are loaded onto an image forming apparatus (DocuCentre-V C7775 produced by FUJIFILM Business Innovation Corp.), and the image quality nonuniformity is evaluated by the following procedure.

Specifically, the shapes of dots in a halftone image having a density of 50% are observed for evaluation.

Evaluation Standard

A: Dots are uniform.

B: Dots are slightly nonuniform.

C: Dots are nonuniform.

D: Dot sizes vary greatly.

Environmental Stability Evaluation

The environmental stability is evaluated by the following procedure.

In a low-temperature, low-humidity environment (10° C./15% RH), a halftone image having a density of 50% is output on 500 A4 paper sheets by using an image forming apparatus, and then the graininess of the image output in a high-temperature, high-humidity environment (28° C./85% RH) is checked by grading.

Evaluation Standard

A: No dot deletion is found.

B: Minor dot deletion is found.

C: Dot deletion is found.

D: Dots are not confirmed.

TABLE 2

| | Inorganic protection layer | | | | | | |
|---|---|---|---|---|---|---|---|
| | First region | | | Second region | | | |
| | Type of metal oxide | Ratio $I_{Al}/(I_{Ga}+I_{Al})$ | Average thickness (μm) | Type of metal oxide | Ratio $I_{Al}/(I_{Ga}+I_{Al})$ | Average thickness (μm) | Average of ratio $I_{Al}/(I_{Ga}+I_{Al})$ |
| Example 1 | Gallium oxide/ Aluminum oxide | 0.5 | 1 | Aluminum oxide | 1 | 5 | 0.92 |
| Comparative Example 1 | — | 0 | 0 | Zinc oxide | 0 | 6 | 0 |
| Example 2 | — | 0 | 0 | Gallium oxide/ Aluminum oxide | 0.45 | 6 | 0.45 |
| Example 3 | — | 0 | 0 | Gallium oxide/ Aluminum oxide | 0.5 | 6 | 0.5 |
| Example 4 | — | 0 | 0 | Gallium oxide/ Aluminum oxide | 0.7 | 6 | 0.7 |
| Example 5 | Aluminum oxide | 1 | 1 | Gallium oxide/ Aluminum oxide | 0.95 | 5 | 0.96 |
| Example 6 | Gallium oxide/ Aluminum oxide | 0.5 | 5 | Aluminum oxide | 1 | 1 | 0.58 |
| Example 7 | Gallium oxide/ Aluminum oxide | 0.5 | 1 | Aluminum oxide | 1 | 5 | 0.92 |

| | Inorganic protection layer | | | Organic photosensitive layer | Evaluation | |
|---|---|---|---|---|---|---|
| | Average of $I_{Ga}$ (%) | Average of $I_{Al}$ (%) | Average of $I_O$ (%) | Absence/presence of silica particles | Evaluation of image quality nonuniformity | Evaluation of environmental stability |
| Example 1 | 3.3 | 36.7 | 60 | Present | A | A |
| Comparative Example 1 | 0 | 0 | 60 | Present | D | D |
| Example 2 | 22.0 | 18 | 60 | Present | C | D |
| Example 3 | 20.0 | 20 | 60 | Present | C | C |
| Example 4 | 12.0 | 28 | 60 | Present | B | C |
| Example 5 | 1.7 | 38.3 | 60 | Present | A | B |
| Example 6 | 16.7 | 23.3 | 60 | Present | C | A |
| Example 7 | 3.3 | 36.7 | 60 | Absent | B | A |

In Table 1, the sign "-" under the "Type of metal oxide" under the "First region" column means that there is no first region. In other words, this means that the inorganic protection layer is a single layer that satisfies "Type of metal oxide", "Ratio $I_{Al}/(I_{Ga}+I_{Al})$", and "Average thickness (μm)".

The aforementioned results indicate that the electrophotographic photoreceptors of Examples can reduce occurrence of image quality nonuniformity.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) An electrophotographic photoreceptor comprising:
a conductive substrate;
an organic photosensitive layer; and
an inorganic protection layer arranged in this order, the inorganic protection layer containing a metal oxide that contains oxygen atoms, gallium atoms, and aluminum atoms.

(((2))) The electrophotographic photoreceptor according to (((1))), wherein, in the inorganic protection layer, an average of a ratio $I_{Al}/(I_{Ga}+I_{Al})$ of an aluminum atomic weight fraction $I_{Al}$ to a total of a gallium atomic weight fraction $I_{Ga}$ and the aluminum atomic weight fraction $I_{Al}$ as measured by X-ray photoelectron spectroscopy is 0.5 or more and 1 or less.

(((3))) The electrophotographic photoreceptor according to (((2))), wherein, in the inorganic protection layer, the average of the ratio $I_{Al}/(I_{Ga}+I_{Al})$ of the aluminum atomic weight fraction $I_{Al}$ to the total of the gallium atomic weight fraction $I_{Ga}$ and the aluminum atomic weight fraction $I_{Al}$ as measured by X-ray photoelectron spectroscopy is 0.7 or more and 1 or less.

(((4))) The electrophotographic photoreceptor according to any one of (((1))) to (((3))), wherein the inorganic protection layer has a first region present on an outer peripheral surface side and a second region that is closer to the conductive substrate than the first region is to the conductive substrate, and the ratio $I_{Al}/(I_{Ga}+I_{Al})$ of the aluminum atomic weight fraction $I_{Al}$ to the total of the gallium atomic weight fraction $I_{Ga}$ and the aluminum atomic weight fraction $I_{Al}$ as measured by X-ray photoelectron spectroscopy is larger in the second region than in the first region.

(((5))) The electrophotographic photoreceptor according to (((4))), wherein the second region has an average thickness larger than an average thickness of the first region.

(((6))) The electrophotographic photoreceptor according to any one of (((1))) to (((5))), wherein the organic photosensitive layer contains silica particles.

(((7))) The electrophotographic photoreceptor according to (((6))), wherein the organic photosensitive layer has a charge generation layer and a charge transport layer that contains at least a charge transport material and silica particles.

(((8))) A process cartridge detachably attachable to an image forming apparatus, the process cartridge comprising the electrophotographic photoreceptor according to any one of (((1))) to (((7))).

(((9))) An image forming apparatus comprising:
the electrophotographic photoreceptor according to any one of (((1))) to (((7)));
a charging device that charges a surface of the electrophotographic photoreceptor;
an electrostatic latent image forming device that forms an electrostatic latent image on the charged surface of the electrophotographic photoreceptor;
a developing device that develops the electrostatic latent image on the surface of the electrophotographic photoreceptor by using a developer containing a toner so as to form a toner image; and
a transfer device that transfers the toner image onto a surface of a recording medium.

(((10))) The image forming apparatus according to (((9))), wherein the developer contains a carrier.

(((11))) The image forming apparatus according to (((10))), wherein the carrier has a volume resistivity of $5\times10^{-7}$ Ω·cm or more and $5\times10^{-9}$ Ω·cm or less.

What is claimed is:

1. An electrophotographic photoreceptor comprising:
a conductive substrate;
an organic photosensitive layer; and
an inorganic protection layer arranged in this order, the inorganic protection layer containing a metal oxide that contains oxygen atoms, gallium atoms, and aluminum atoms,
wherein the inorganic protection layer has a first region present on an outer peripheral surface side and a second region that is closer to the conductive substrate than the first region is to the conductive substrate, and
a ratio $I_{Al}/(I_{Ga}+I_{Al})$ of an aluminum atomic weight fraction $I_{Al}$ to a total of a gallium atomic weight fraction $I_{Ga}$ and the aluminum atomic weight fraction $I_{Al}$ as measured by X-ray photoelectron spectroscopy is larger in the second region than in the first region.

2. The electrophotographic photoreceptor according to claim 1, wherein, in the inorganic protection layer, an average of the ratio $I_{Al}/(I_{Ga}+I_{Al})$ of the aluminum atomic weight fraction $I_{Al}$ to the total of the gallium atomic weight fraction $I_{Ga}$ and the aluminum atomic weight fraction $I_{Al}$ as measured by X-ray photoelectron spectroscopy in each of the first region and the second region is 0.5 or more and 1 or less.

3. The electrophotographic photoreceptor according to claim 2, wherein, in the inorganic protection layer, the average of the ratio $I_{Al}/(I_{Ga}+I_{Al})$ of the aluminum atomic weight fraction $I_{Al}$ to the total of the gallium atomic weight fraction $I_{Ga}$ and the aluminum atomic weight fraction $I_{Al}$ as measured by X-ray photoelectron spectroscopy in each of the first region and the second region is 0.7 or more and 1 or less.

4. The electrophotographic photoreceptor according to claim 1, wherein the second region has an average thickness larger than an average thickness of the first region.

5. The electrophotographic photoreceptor according to claim 1, wherein the organic photosensitive layer contains silica particles.

6. The electrophotographic photoreceptor according to claim 5, wherein the organic photosensitive layer has a charge generation layer and a charge transport layer that contains at least a charge transport material and silica particles.

7. A process cartridge detachably attachable to an image forming apparatus, the process cartridge comprising the electrophotographic photoreceptor according to claim 1.

8. A process cartridge detachably attachable to an image forming apparatus, the process cartridge comprising the electrophotographic photoreceptor according to claim 2.

9. A process cartridge detachably attachable to an image forming apparatus, the process cartridge comprising the electrophotographic photoreceptor according to claim 3.

10. A process cartridge detachably attachable to an image forming apparatus, the process cartridge comprising the electrophotographic photoreceptor according to claim 4.

11. A process cartridge detachably attachable to an image forming apparatus, the process cartridge comprising the electrophotographic photoreceptor according to claim 5.

12. A process cartridge detachably attachable to an image forming apparatus, the process cartridge comprising the electrophotographic photoreceptor according to claim 6.

13. An image forming apparatus comprising:

the electrophotographic photoreceptor according to claim 1;

a charging device that charges a surface of the electrophotographic photoreceptor;

an electrostatic latent image forming device that forms an electrostatic latent image on the charged surface of the electrophotographic photoreceptor;

a developing device that develops the electrostatic latent image on the surface of the electrophotographic photoreceptor by using a developer containing a toner so as to form a toner image; and a transfer device that transfers the toner image onto a surface of a recording medium.

14. An image forming apparatus comprising:

the electrophotographic photoreceptor according to claim 2;

a charging device that charges a surface of the electrophotographic photoreceptor;

an electrostatic latent image forming device that forms an electrostatic latent image on the charged surface of the electrophotographic photoreceptor;

a developing device that develops the electrostatic latent image on the surface of the electrophotographic photoreceptor by using a developer containing a toner so as to form a toner image; and a transfer device that transfers the toner image onto a surface of a recording medium.

15. An image forming apparatus comprising:

the electrophotographic photoreceptor according to claim 3;

a charging device that charges a surface of the electrophotographic photoreceptor;

an electrostatic latent image forming device that forms an electrostatic latent image on the charged surface of the electrophotographic photoreceptor;

a developing device that develops the electrostatic latent image on the surface of the electrophotographic photoreceptor by using a developer containing a toner so as to form a toner image; and a transfer device that transfers the toner image onto a surface of a recording medium.

16. The image forming apparatus according to claim 13, wherein the developer contains a carrier.

17. The image forming apparatus according to claim 16, wherein the carrier has a volume resistivity of $5\times10^{-7}$ Ω·cm or less and $5\times10^{-9}$ Ω·cm or more.

* * * * *